(12) United States Patent
Sarkar

(10) Patent No.: US 12,141,286 B2
(45) Date of Patent: Nov. 12, 2024

(54) ESTABLISHING A CHAIN OF OWNERSHIP OF A DEVICE

(71) Applicant: Micron Technology, Inc., Boise, ID (US)

(72) Inventor: Sourin Sarkar, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 194 days.

(21) Appl. No.: 17/858,560

(22) Filed: Jul. 6, 2022

(65) Prior Publication Data

US 2023/0394152 A1  Dec. 7, 2023

Related U.S. Application Data

(60) Provisional application No. 63/347,821, filed on Jun. 1, 2022.

(51) Int. Cl.
*H04L 9/00* (2022.01)
*G06F 21/57* (2013.01)
*G06F 21/60* (2013.01)
*G06F 21/73* (2013.01)

(52) U.S. Cl.
CPC ............ *G06F 21/57* (2013.01); *G06F 21/602* (2013.01); *G06F 21/73* (2013.01); *H04L 9/50* (2022.05)

(58) Field of Classification Search
CPC ........ G06F 21/57; G06F 21/602; G06F 21/73; H04L 9/50
USPC .......................................................... 713/189
See application file for complete search history.

(56) References Cited

U.S. PATENT DOCUMENTS

| | | | |
|---|---|---|---|
| 11,062,042 B1 * | 7/2021 | McKervey | G06F 16/137 |
| 2020/0296100 A1 * | 9/2020 | Prahlad | G06F 21/6218 |
| 2020/0348844 A1 * | 11/2020 | Danilov | G06F 3/0614 |
| 2023/0067574 A1 * | 3/2023 | Nagar | G06F 16/182 |
| 2023/0251898 A1 * | 8/2023 | Ji | G06F 9/4881 |
| | | | 718/106 |

* cited by examiner

*Primary Examiner* — Badri Narayanan Champakesan
(74) *Attorney, Agent, or Firm* — Harrity & Harrity, LLP

(57) ABSTRACT

Implementations described herein relate to establishing a chain of ownership of a device. In some implementations, the device may determine first ownership metadata based on first ownership data associated with the device. The device may split the first ownership metadata into a first portion of first ownership metadata and a second portion of first ownership metadata. The device may store, in the memory of the device, the first portion of first ownership metadata. The device may transmit, to a server, the second portion of first ownership metadata for storage in a blockchain ledger of a blockchain node. A chain of ownership associated with the device may be established based on a combination of the first portion of first ownership metadata stored in the memory of the device and the second portion of first ownership metadata stored in the blockchain ledger.

25 Claims, 18 Drawing Sheets

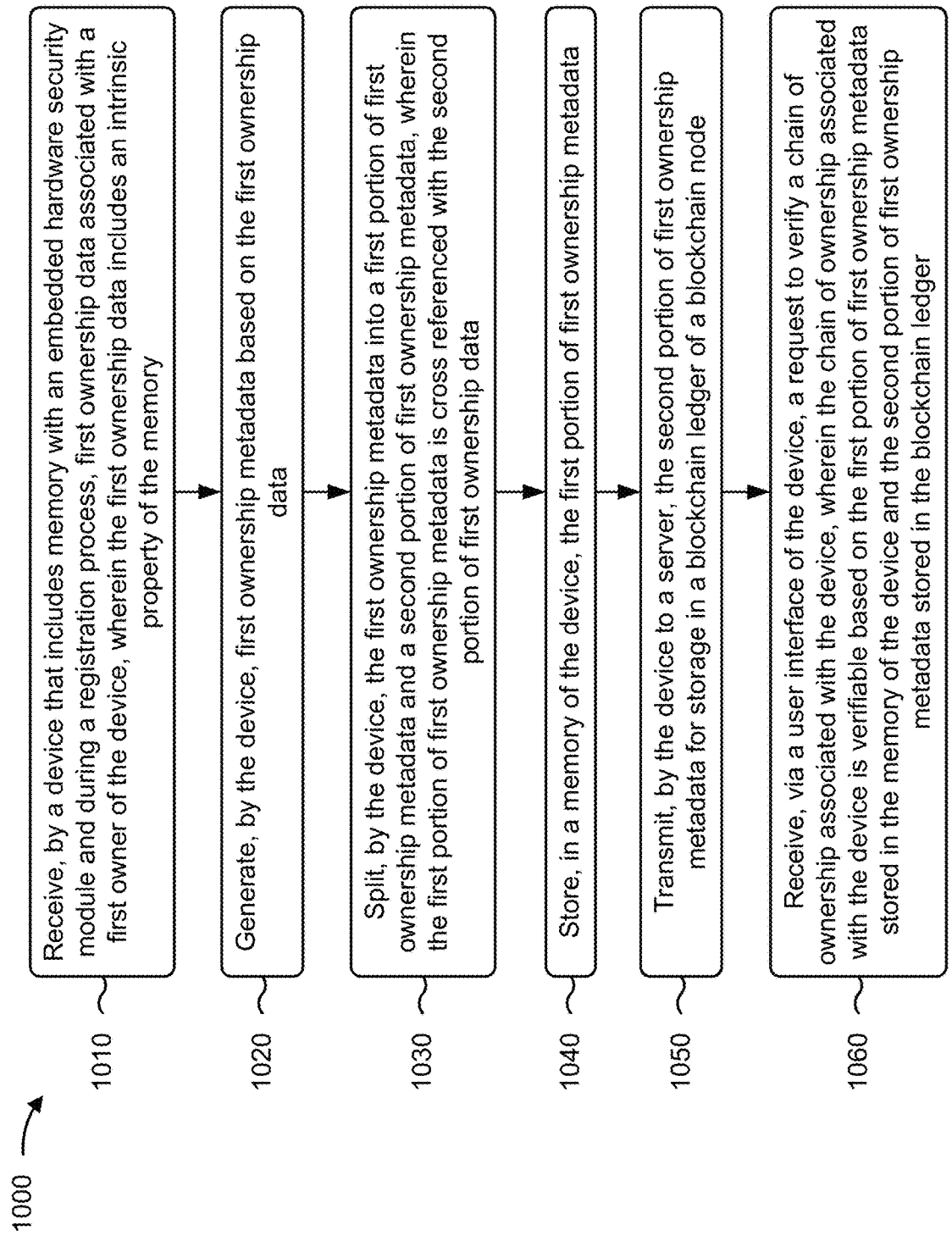

ESTABLISHING A CHAIN OF OWNERSHIP OF A DEVICE

CROSS-REFERENCE TO RELATED APPLICATION

This Patent Applications claims priority to U.S. Provisional Patent Application No. 63/347,821, filed on Jun. 1, 2022, and entitled "ESTABLISHING A CHAIN OF OWNERSHIP OF A DEVICE." The disclosure of the prior Applications is considered part of and is incorporated by reference into this Patent Applications.

TECHNICAL FIELD

The present disclosure generally relates to device ownership and, for example, establishing a chain of ownership of a device.

BACKGROUND

A device, such as an electronic device which may include a vehicle, mobile device, or computer, may be produced by a manufacturer and sold to a user. The device may be owned by a plurality of users over a lifespan of the device. For example, a first owner may own the device for a first period of time, and then may transfer the device to a second owner, who may then own the device for a second period of time. A chain of ownership may be associated with the device over the lifespan of the device.

BRIEF DESCRIPTION OF THE DRAWINGS

FIGS. 8-10 are flowcharts of example processes relating to establishing a chain of ownership of a device.

DETAILED DESCRIPTION

Figure 1:
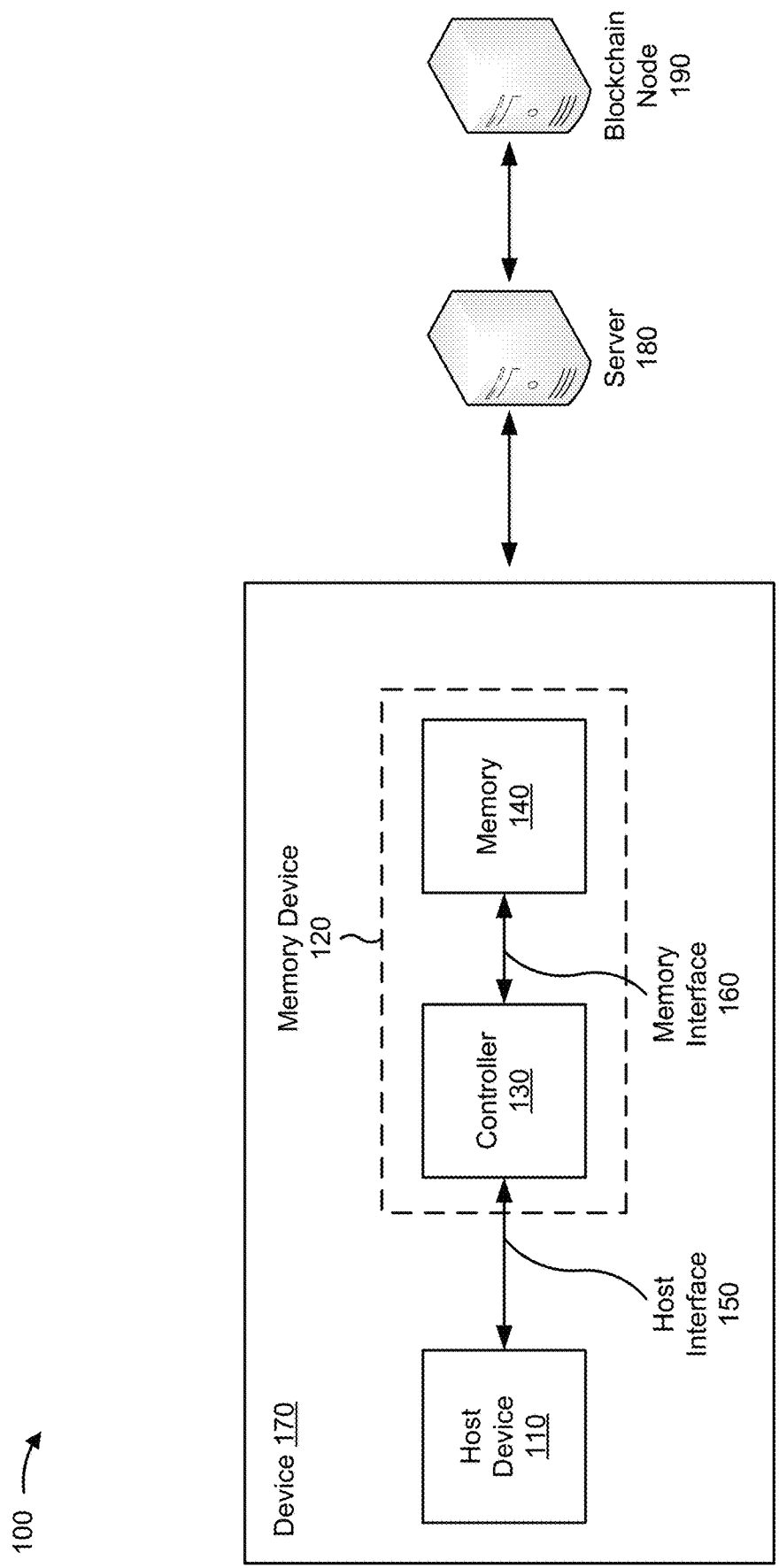
FIG. 1 is a diagram illustrating an example system capable of establishing a chain of ownership of a device.

A device may be manufactured by a company and sold to a user. The device may be an electronic device, such as a vehicle, a mobile phone, a laptop, a workstation, or another type of electronic device. Oftentimes, a single user may not use the device for an entirely of a lifespan of the device. The device may be passed down to several users over the lifespan of the device.

For example, a first owner may purchase a vehicle that is new, and then may later sell the vehicle as used to a second owner. The second owner may sell the vehicle to a third owner. Since vehicles may often be operable for tens of years, it is typical for vehicles to have multiple owners during the lifespans of the vehicles. As another example, a first owner may purchase a mobile phone as new, and at a later time, the mobile phone may be sold as used to a second owner. The first owner may sell the mobile phone to upgrade to a newer model, and the second owner may purchase the mobile phone secondhand to reduce cost.

One problem with the above is that a chain of ownership of the device may not be properly maintained during the lifespan of the device. The chain of ownership may function to indicate owners of the device during the lifespan of the device, where the chain of ownership may begin from a manufacturing of the device. The chain of ownership may include ownership information that is falsified or incomplete. The ownership information may be compromised, tampered, hacked, and/or replaced with malicious information. The ownership information may indicate owners with no physical existence, or owner identities may be falsified. As a result, the risk that the security of the device has been compromised (e.g., due to a previous owner installing a backdoor to secretly access the device) may be increased, and/or an actual value of the device may be less than an estimated value of the device.

For example, the ownership information may indicate that a particular device has been previously owned by two different owners, but in actuality, the device may have been previously owned by five different owners, which if known would otherwise decrease a value of the device.

The chain of ownership of the device may need to be verified for various government, forensic, data security, and/or device security reasons. Although the chain of ownership may be established through an external framework in which the device is registered, this approach may create numerous loopholes which may be exploited with malicious intent, thereby making it difficult to establish a single point of trust that is able to verify the chain of ownership and transfer of ownership.

To solve the problems described above, as well as to establish a chain of ownership of a device, a technical solution is described herein for establishing a non-repudiable chain of ownership of the device using memory of the device, which may include an embedded hardware security module, and a blockchain ledger of a blockchain node. The device may establish the non-repudiable chain of ownership of the device using intrinsic properties of the memory. The intrinsic properties of the memory may include intrinsic properties of the embedded hardware security module of the memory. When the device is owned by an owner, which may be an entity such as a user or an organization, ownership metadata associated with the owner may be established using ownership data, which may include the intrinsic properties of the memory. An intrinsic property of the memory may be an intrinsic device property identifier, which may be a digital fingerprint that serves as a unique identifier. The intrinsic device property identifier may be based on unique physical variations of the memory which occur naturally during semiconductor processing. The ownership data may include a unique owner identity, such as a social security number of biometric data associated with the owner.

In some implementations, when an owner (e.g., a first owner or a subsequent owner) obtains ownership of the device, the owner may be required to complete a registration process of the device. During the registration process, the device may collect the ownership data, and then provide the ownership data to a server. The server may be associated with a registration gateway. The server may verify the ownership data, and indicate to the device that the ownership parameters have been successfully verified.

In some implementations, the device may generate ownership metadata based on the ownership data. For example, the device may generate the ownership metadata based on a hash of the ownership data. After the ownership metadata is created, the device may split the ownership metadata into two parts. A first portion of the ownership metadata may be stored in the memory of the device. In other words, the first portion of ownership metadata may be stored in a cryptographically protected, non-erasable portion of secure memory of the device. The first portion of ownership metadata may only be accessible through cryptographically secure read and write commands. The memory may be accessible to a host device, via a host-to-device-memory interface, which may use a public key infrastructure that is protected using asymmetric cryptography. A second portion of the ownership metadata may be stored in a blockchain ledger of a blockchain node, where the blockchain ledger may be owned and/or operated by a central authority. The non-repudiable chain of ownership of the device may be established based on a combination of the first portion of ownership metadata, stored in the memory, and the second portion of ownership metadata, stored in the blockchain ledger. By storing the ownership metadata, partially in the memory of the device and partially in the blockchain ledger, the registration process of the device cannot be completed.

In some implementations, the device may transmit, to the server, to second portion of ownership metadata for storage in the blockchain ledger. The server may be associated with a trusted gateway or security gateway. The server may store, in the blockchain ledger, the second portion of ownership metadata (e.g., unique device-specific ownership metadata) in a cryptographically secure memory location, which may be associated with the blockchain ledger. The cryptographically secure memory location may be verifiable through a trusted authority. The second portion of ownership metadata may be committed to the blockchain ledger.

In some implementations, the owner of the device (e.g., the first owner or the subsequent owner of the device) may check and verify the chain of ownership of the device using the ownership metadata, which may partially be stored in the memory of the device and partially stored in the blockchain ledger. By combining the first portion of ownership metadata and the second portion of ownership metadata, the ownership data may be derived, which may indicate the chain of ownership to the owner of the device.

In some implementations, the memory with the embedded hardware security module may function to embed a root of trust within the device. Embedding the root of trust within the device may provide an additional point of verification, and may help to establish a non-repudiable source of ownership tracing. The non-repudiable chain of ownership may be established for various implementations, which may include vehicles, mobile phones, government devices, military applications, medical devices, manufacturing, and/or portable scientific devices. The non-repudiable chain of ownership, which may be based on the ownership data including the intrinsic device property identifier and the unique owner identity, may help to prevent ownership fraud and history fraud. Further, the owner of the device or another interested entity may automatically obtain a protection cover, without the need for extensive dependency on third party agencies.

FIG. 1 is a diagram illustrating an example system 100 capable of establishing a chain of ownership of a device 170. The system 100 may include one or more devices, apparatuses, and/or components for performing operations described herein. For example, the system 100 may include the device 170, which may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The device 170 may be any electronic device configured to store data in memory. For example, the device 170 may be an implementation, which may include a computer, a mobile phone, a wired or wireless communication device, a network device, a server, a vehicle (e.g., an automobile or an airplane), and/or an Internet of Things (IoT) device. The device 170 may communicate with a server 180 and a blockchain node 190, which may store a blockchain ledger. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The memory device 120 may be any electronic device configured to store data in memory. In some implementations, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM. In some implementations, the memory 140 may include non-volatile memory configured to maintain stored data after the memory device 120 is powered off, such as NAND memory or NOR memory. For example, the non-volatile memory may store persistent firmware or other instructions for execution by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, device 170 (e.g., the host device 110 of the device 170) may determine ownership metadata based on ownership data associated with the device 170. The ownership data may be associated with an owner of the device 170. The device 170 may split the ownership metadata into a first portion of ownership metadata and a second portion of ownership metadata. The first portion of ownership metadata may be correlated with the second portion of ownership data. The device 170 may store, in the memory 140, the first portion of ownership metadata. The device 170 may transmit, to the server 180, the second portion of ownership metadata for storage in the blockchain ledger of the blockchain node 190. A chain of ownership associated with the device 170 may be established based on a combination of the first portion of ownership metadata stored in the memory 140 and the second portion of ownership metadata stored in the blockchain ledger.

As indicated above, FIG. 1 is provided as an example. Other examples may differ from what is described with regard to FIG. 1.

Figure 2:
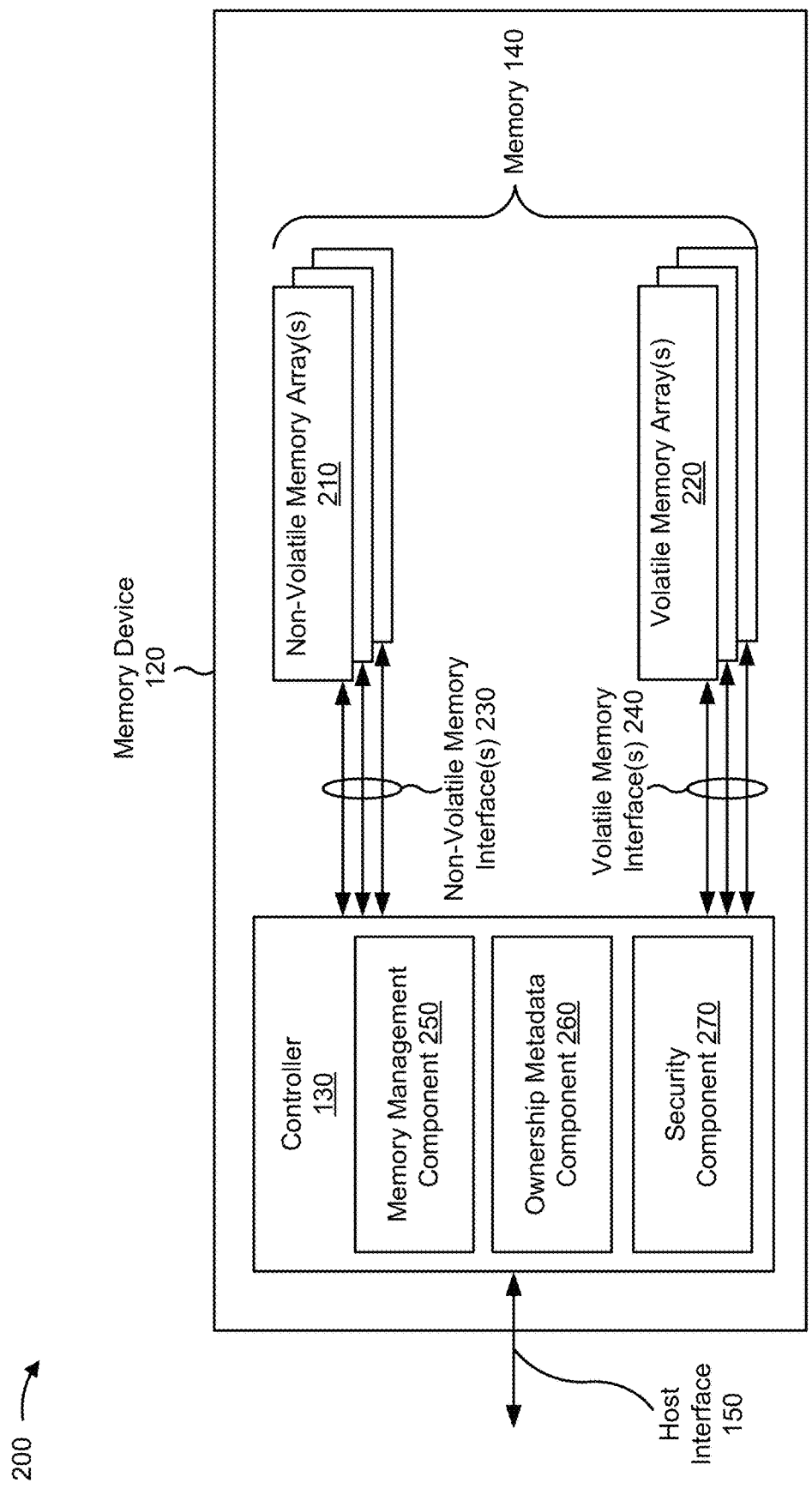
FIG. 2 is a diagram of example components included in a memory device.

FIG. 2 is a diagram of example 200 of components included in the memory device 120 of FIG. 1. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, an ownership metadata component 260, and/or a security component 270. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The ownership metadata component 260 may be configured to read ownership metadata (e.g., parts of ownership metadata) from the non-volatile memory array(s) 210 and/or the volatile memory array(s) 220. The ownership metadata component 260 may be configured to write ownership metadata (e.g., parts of ownership metadata) to the non-volatile memory array(s) 210 and/or the volatile memory array(s) 220.

The security component 270 may be configured to perform one or more security operations for the memory device 120. For example, the security component 270 may be configured to encrypt or decrypt data, such as data read from the memory 140 and/or data to be written to the memory 140. Additionally, or alternatively, the security component 270 may be configured to validate commands received from the host device 110, such as by validating a cryptographic signature of a command (e.g., using one or more cryptographic keys).

Figure 7:
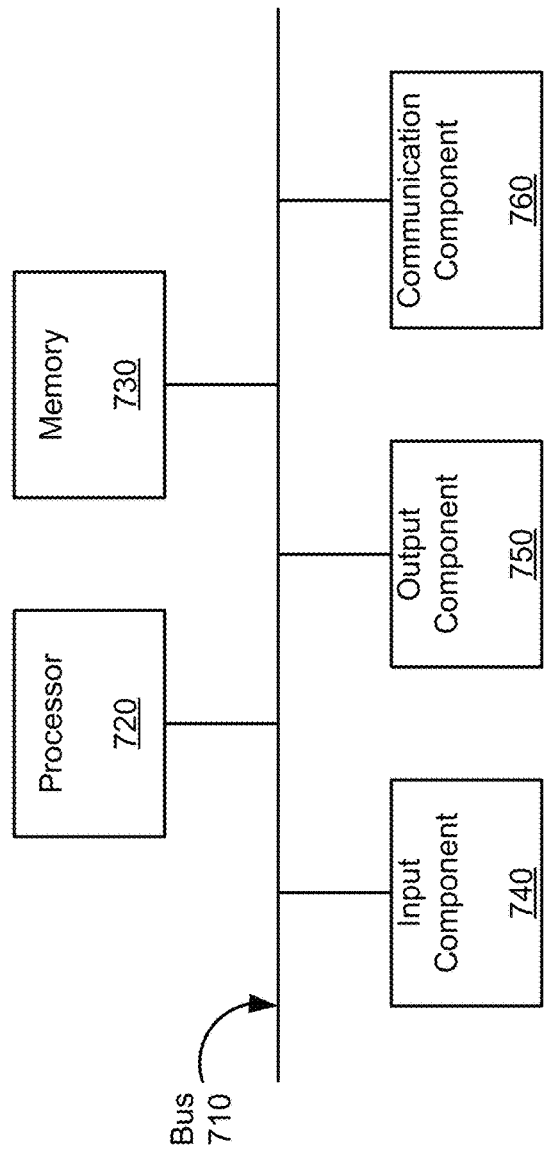
FIG. 7 is a diagram of example components of one or more devices of FIG. 6.
Figure 8:
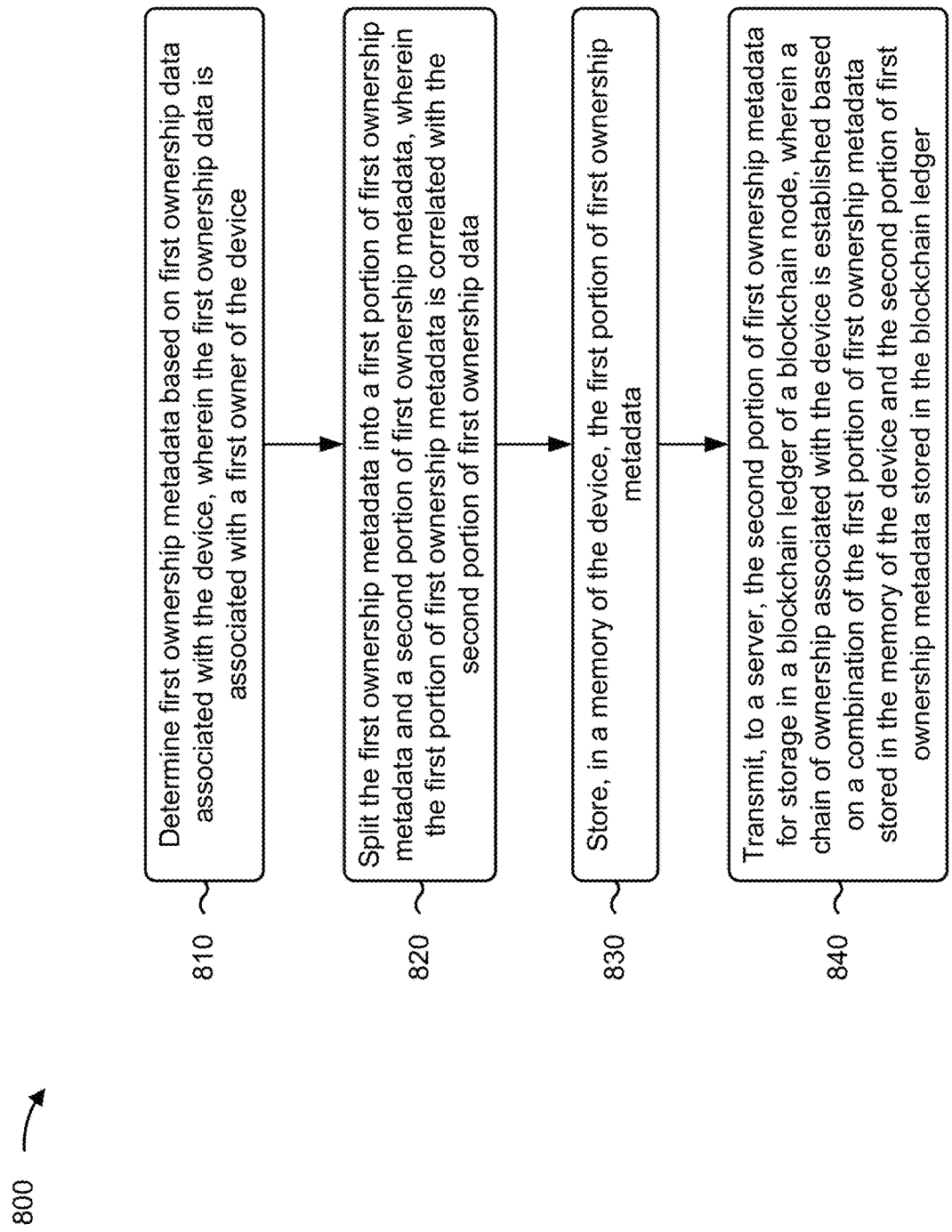
Figure 9:
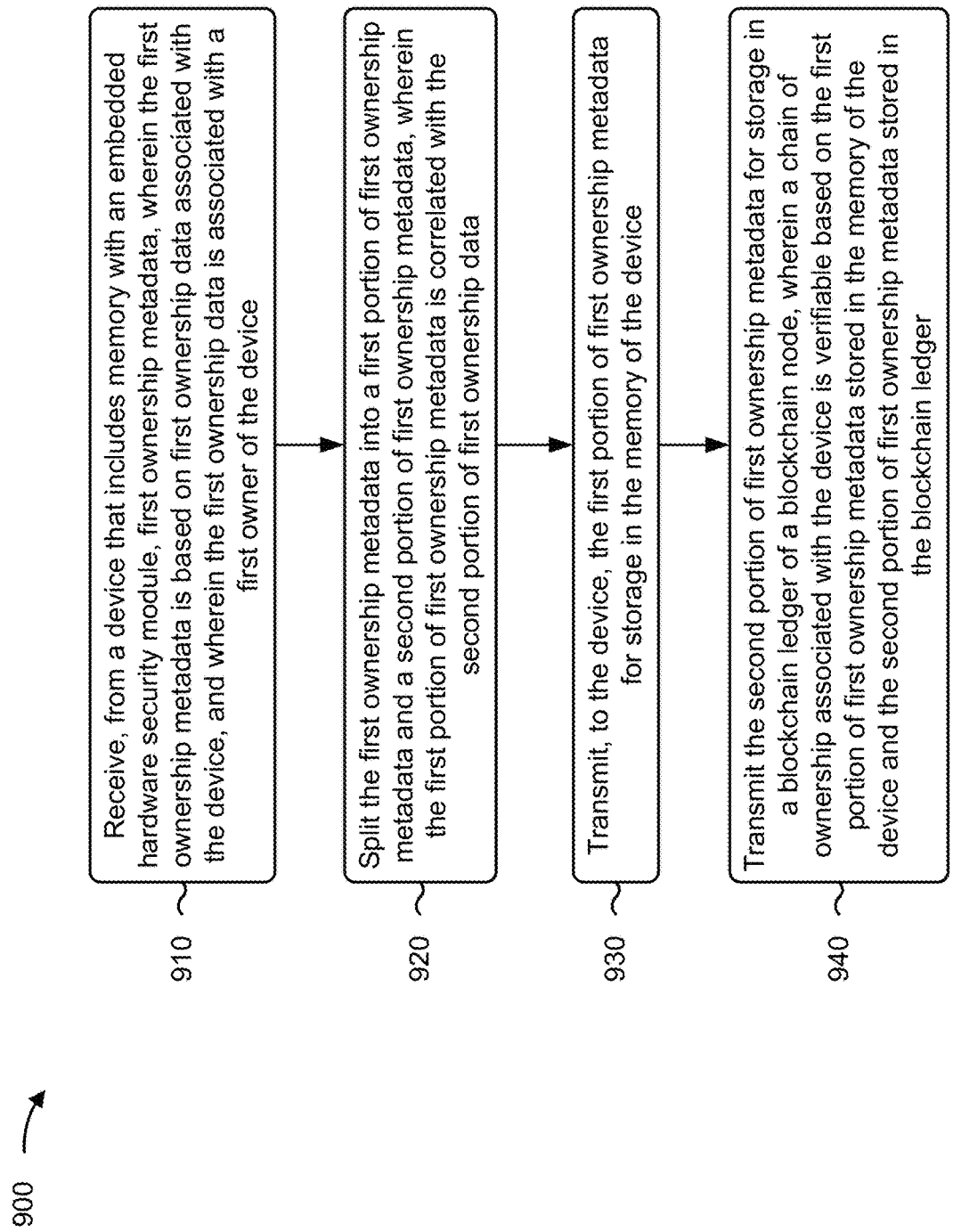

One or more devices or components shown in FIG. 2 may be used to carry out operations described elsewhere herein, such as one or more operations of FIGS. 3A to 3F, 4A to 4D, and 5-7 and/or one or more process blocks of the methods of FIGS. 8-10. For example, the controller 130, the memory management component 260, and/or the security component 270 may perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

FIGS. 3A-3F are diagrams of an example implementation 300 relating to establishing a chain of ownership of a device. As shown in FIGS. 3A-3F, example implementation 300 includes a device, a server, and a blockchain node that maintains a blockchain ledger. The device may include memory with an embedded hardware security module. The memory may be a secure memory having the embedded hardware security module. The device may be an electronic device, such as a vehicle, a laptop, a computer, or any other type of device for which establishing a chain of ownership is desired. The server may be a single entity, or the server may be separated into multiple entities, such as a registration gateway and/or a security gateway. The server and/or the blockchain ledger may be associated with a manufacturer of the memory with the embedded hardware security module. Alternatively, the server and/or the blockchain ledger may be associated with a manufacturer of the device that contains the memory with the embedded hardware security module. These devices are described in more detail in connection with FIGS. 6 and 7.

Figure 3A:
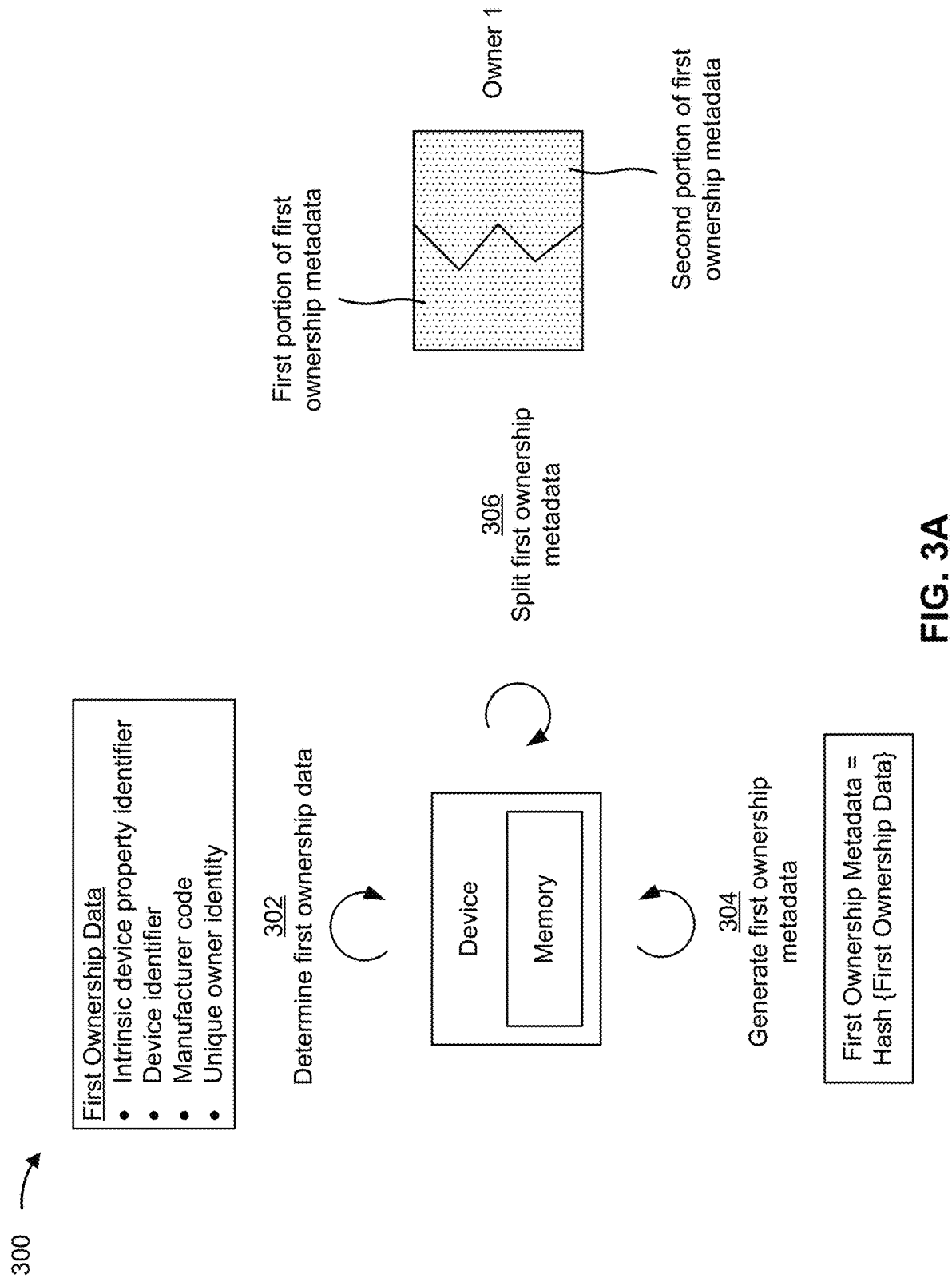
FIGS. 3A-3F are diagrams of an example implementation relating to establishing a chain of ownership of a device.

As shown in FIG. 3A, and by reference number 302, the device may determine first ownership data. The first ownership data may be associated with a first owner of the device. The device may determine the first ownership data during a registration process of the device, which may occur when the device is newly purchased (or when an ownership of the device is transferred between owners).

In some implementations, the first ownership data may include an intrinsic device property identifier. The intrinsic device property identifier may be associated with the memory. The intrinsic device property identifier may be associated with the embedded hardware security module of the memory. The intrinsic device property identifier may be a digital fingerprint that serves as a unique identifier of the device. The intrinsic device property identifier may be based on unique physical variations of the memory which occur naturally during semiconductor processing. The first ownership data may include a device identifier or an implementation identifier. For example, when the device is a vehicle, the device identifier may be a vehicle identification number (VIN). The first ownership data may include a manufacturer code. The first ownership data may include owner identification data, which may include a unique owner identity associated with the first owner. The unique owner identity may be a social security number, biometric data, or other types of information to uniquely identify the first owner of the device. During the registration process, the owner may be required to input some type of unique owner identification information, such as the owner's social security number or biometric data. The biometric data may include fingerprint data, height data, weight data, and/or other types of data that may uniquely identify the owner.

In some implementations, the device may transmit the first ownership data, or a portion of the first ownership data such as the unique owner identity, to the server. The server may maintain a data store of owner identification information for a plurality of owners. The server may compare the unique owner identity with the owner identification information for the plurality of owners, and based on the comparison, the server may verify that the unique owner identity is valid. The device may receive, from the server, an indication that the first ownership data has been verified. After the first ownership data has been verified, which may be indicated to the device via the indication, the device may be able to use the first ownership data to generate first ownership metadata.

As shown by reference number 304, the device may determine the first ownership metadata. The device may determine the first ownership metadata based on the first ownership data. In other words, the device may derive the first ownership metadata from the first ownership data. In some implementations, the device may apply a cryptographic function to the first ownership data to obtain the first ownership metadata. As an example, the first ownership metadata may be a hash of the first ownership metadata.

As shown by reference number 306, the device may split the first ownership metadata into a first portion of first ownership metadata and a second portion of first ownership metadata. The first portion of first ownership metadata may be approximately the same size as the second portion of first ownership metadata (e.g., the first ownership metadata may roughly be split in halves of equal sizes), or alternatively, the first portion of first ownership metadata may be a different size than the second portion of first ownership metadata (e.g., a size of the first portion of first ownership metadata may be approximately 70% of a size of the first ownership metadata, and a size of the second portion of first ownership metadata may be approximately 30% of the size of the first ownership metadata). The device may use any suitable technique for splitting the first ownership metadata to form the first portion of first ownership metadata and the second portion of first ownership metadata. The first portion of first ownership metadata and the second portion of first ownership metadata may be uniquely identifiable blocks of data.

In some implementations, the first portion of first ownership metadata may be correlated with or cross referenced with the second portion of first ownership data. The first portion of first ownership metadata may include metadata or some other mechanism for indicating that the first portion of first ownership metadata is only combinable with the second portion of first ownership metadata. Similarly, the second portion of first ownership metadata may include metadata or some other mechanism for indicating that the second portion of first ownership metadata is only combinable with the first portion of first ownership metadata. Attempting to combine the second portion of first ownership metadata with any data other than the first portion of first ownership metadata may fail. Further, any modification to the first portion of first ownership metadata (e.g., via hacking) may later prevent the first portion of first ownership metadata from being combined with the second portion of first ownership metadata, since the first portion of first ownership metadata may no longer match the second portion of first ownership metadata. Similarly, any modification to the second portion of first ownership metadata may later prevent the second portion of first ownership metadata from being combined with the first portion of first ownership metadata.

In some implementations, the first portion of first ownership metadata and the second portion of first ownership metadata may be created by breaking the first ownership metadata, such that the first portion of first ownership metadata and the second portion of first ownership metadata may be unique parts of the first ownership metadata. Before breaking the first ownership metadata apart (as per an implementation logic), a measurement of the first ownership metadata (e.g., a checksum of the first ownership metadata) may be taken and stored in a cryptographically protected store of the device. The measurement associated with the first ownership metadata may be a golden measurement of the first ownership metadata. When any bit of the first portion of first ownership metadata and/or the second portion of first ownership metadata is modified (e.g., due to tampering), and then the first portion of first ownership metadata and the second portion of first ownership metadata are combined to form the first ownership metadata, a new measurement of the first ownership metadata may not match the golden measurement due to the bit being modified.

Figure 3B:
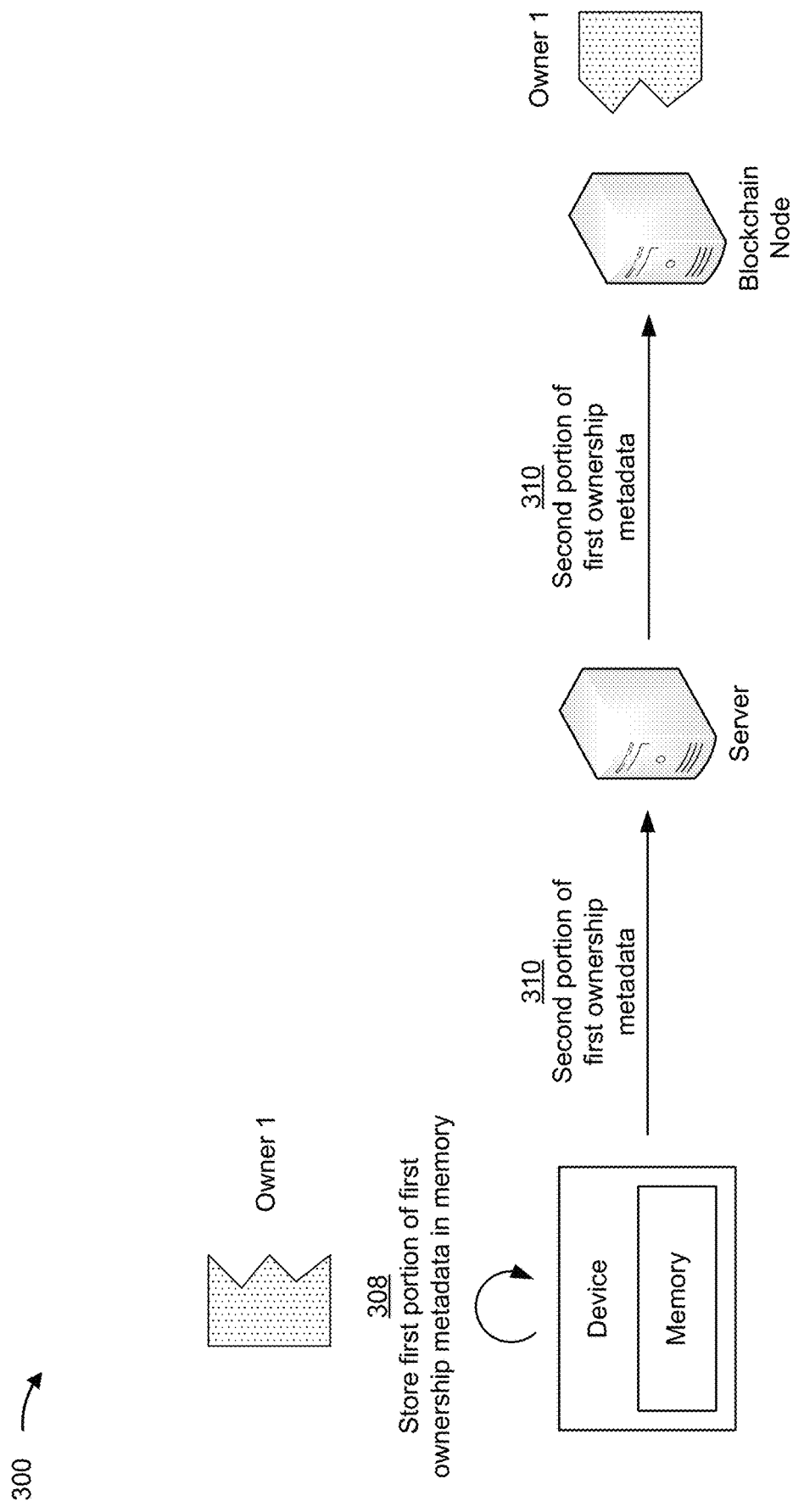

As shown in FIG. 3B, and by reference number 308, the device may store, in the memory of the device, the first portion of first ownership metadata. The device may store the first portion of first ownership metadata in the memory with the embedded hardware security module, which may prevent the first portion of first ownership metadata from being modified. As a result, the first portion of first ownership metadata cannot be maliciously modified in order to alter ownership information. The device may store the first portion of first ownership metadata in the memory for a lifetime of the device (e.g., until the device is decommissioned).

As shown by reference number 310, the device may transmit, to the server, the second portion of first ownership metadata for storage in the blockchain ledger of the blockchain node. The server may receive the second portion of first ownership metadata, and the server may store the second portion of first ownership metadata in the blockchain ledger maintained by the blockchain node. An inherent security of the blockchain ledger may prevent the second portion of first ownership metadata from being modified. The blockchain ledger may be protected by blockchain fundamental tenets of proof-of-work credibility and non-repudiability. As a result, the second portion of first ownership metadata cannot be maliciously modified in order to alter ownership information. The second portion of first ownership metadata may be associated with a digest that is stored into the blockchain ledger. The blockchain node may store the second portion of first ownership metadata in the blockchain ledger for the lifetime of the device (e.g., until the device is decommissioned).

In some implementations, a backup copy of the first portion of first ownership metadata may be stored in the memory of the device. Similarly, a backup copy of the second portion of first ownership metadata may be stored in the blockchain ledger. The backup copies of the first and second portions of first ownership metadata may be maintained to improve reliability.

In some implementations, the device may encrypt the first portion of first ownership metadata prior to storage in the memory of the device. The device may encrypt the second portion of first ownership metadata prior to storage in the blockchain ledger. In other words, the first portion of first ownership metadata stored in the memory of the device may be encrypted, and the second portion of first ownership metadata stored in the blockchain ledger may be encrypted.

In some implementations, the chain of ownership associated with the device may be established based on the first portion of first ownership metadata stored in the memory of the device and the second portion of first ownership metadata stored in the blockchain ledger. In other words, the chain of ownership for the device, which may correspond to ownership by the first owner, may be maintained based on a combination of the first portion of first ownership metadata and the second portion of first ownership metadata.

Figure 3C:
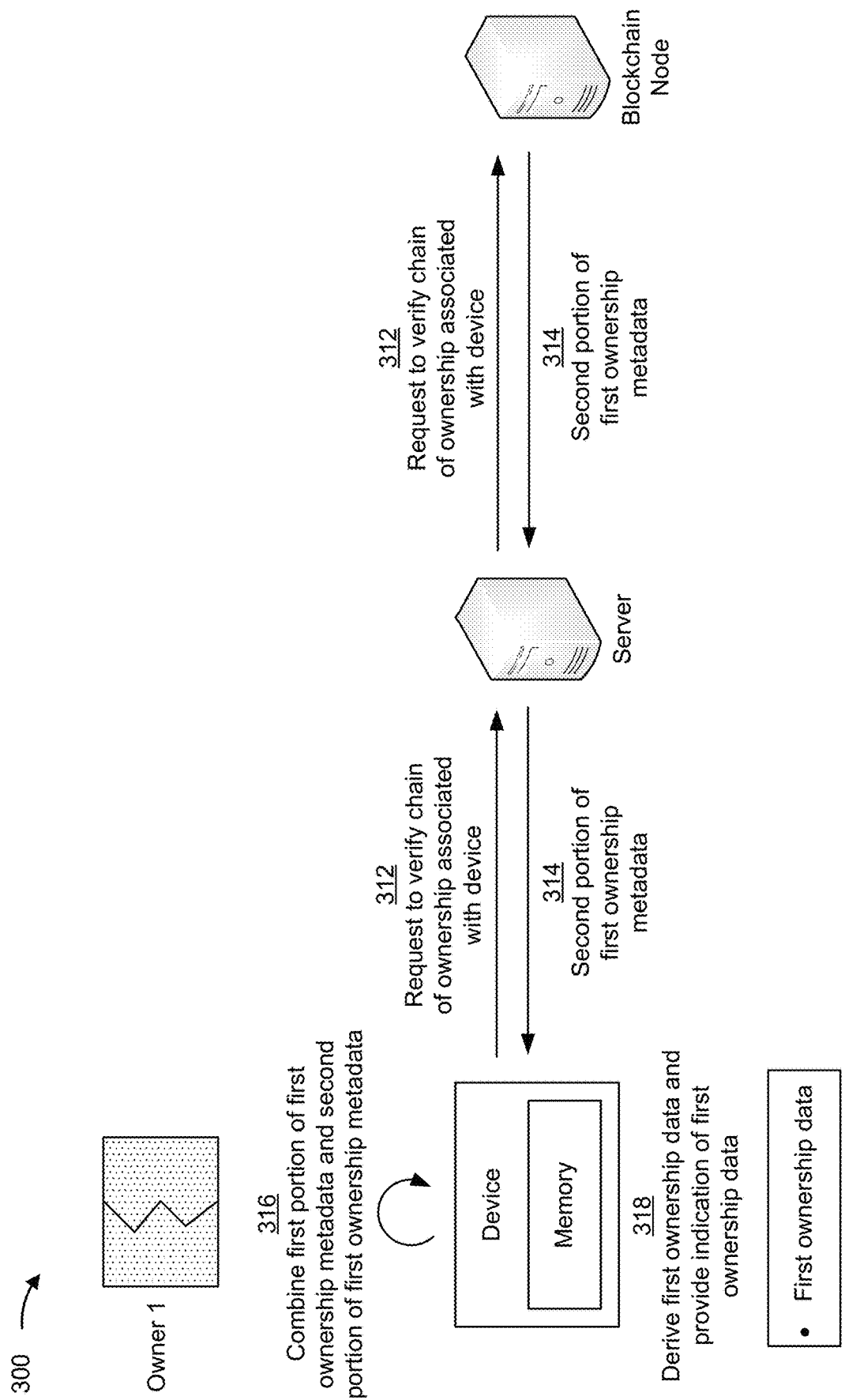

As shown in FIG. 3C, and by reference number 312, the device may transmit, to the server, a request to verify the chain of ownership associated with the device. The device may transmit the request based on an instruction received via a user interface of the device. For example, the first owner may instruct, via the user interface, to verify the chain of ownership associated with the device. Alternatively, a new owner or a prospective owner may instruct, via the user interface, to verify the chain of ownership associated with the device. The server may receive the request from the device. The server may access the second portion of first ownership metadata from the blockchain node. In other words, the server may send a command to retrieve the second portion of first ownership metadata, which may be stored in the blockchain ledger maintained by the blockchain node.

As shown by reference number 314, the device may receive, from the server and based on the request, the second portion of first ownership metadata. The device may receive the second portion of first ownership metadata from the blockchain node via the server.

As shown by reference number 316, the device may combine the first portion of first ownership metadata, stored in the memory of the device, with the second portion of first ownership metadata received from the server, to form the first ownership metadata. The first portion of first ownership metadata and the second portion of first ownership metadata may be an algorithmic exact match, which may enable the combination to be made. The device may determine that the first portion of first ownership metadata is able to be combined with the second portion of first ownership metadata based on a determination that the first portion of first ownership metadata has not been modified, while stored in the memory of the device, and based on a determination that the second portion of first ownership metadata has not been modified, while stored in the blockchain ledger. In other words, the device may combine the first portion of first ownership metadata with the second portion of first ownership metadata based on the determination that the first portion of first ownership metadata is able to be combined with the second portion of first ownership metadata. When the first portion of first ownership metadata and/or the second portion of first ownership metadata has been modified, in relation to a previous version, the device may be unable to combine the first portion of first ownership metadata and the second portion of first ownership metadata, and the device may output an alert indicating that the first portion of first ownership metadata and/or the second portion of first ownership metadata may have been tampered with. The alert may indicate that an unauthorized modification has been made to a portion of the first ownership metadata.

In some implementations, a combination logic for combining the first portion of first ownership metadata and the second portion of first ownership metadata may be based on splitting logic used to split the first ownership metadata to derive the first portion of first ownership metadata and the second portion of first ownership metadata. The combination logic may be implementation dependent. The splitting logic and the combination logic may define a mechanism for breaking ownership metadata and joining the broken ownership metadata, respectively.

For (a) if process/algorithm X is chosen, then for (b) process/algorithm X' must be chosen to recreate the WHOLE.

In some implementations, the device may decrypt the first portion of first ownership metadata and the second portion of first ownership metadata, prior to combining the first portion of first ownership metadata with the second portion of first ownership metadata, to form the first ownership metadata. In other words, the first portion of first ownership metadata retrieved from the memory of the device may be decrypted, and the second portion of first ownership metadata retrieved from the blockchain ledger may be decrypted. The device may decrypt the first portion of first ownership metadata and the second portion of first ownership metadata based on a secure key received from the server.

As shown by reference number 318, the device may determine or derive the first ownership data based on the first ownership metadata. The device may apply a cryptographic function (e.g., a reverse function) to the first ownership metadata to obtain the first ownership data. The device may output, via the user interface, an indication of the first ownership data, where the indication may indicate a verifiable identity of the first owner of the device. The first owner, a new owner, or a prospective owner may confirm the chain of ownership associated with the device based on the indication of the first ownership data.

Figure 3D:
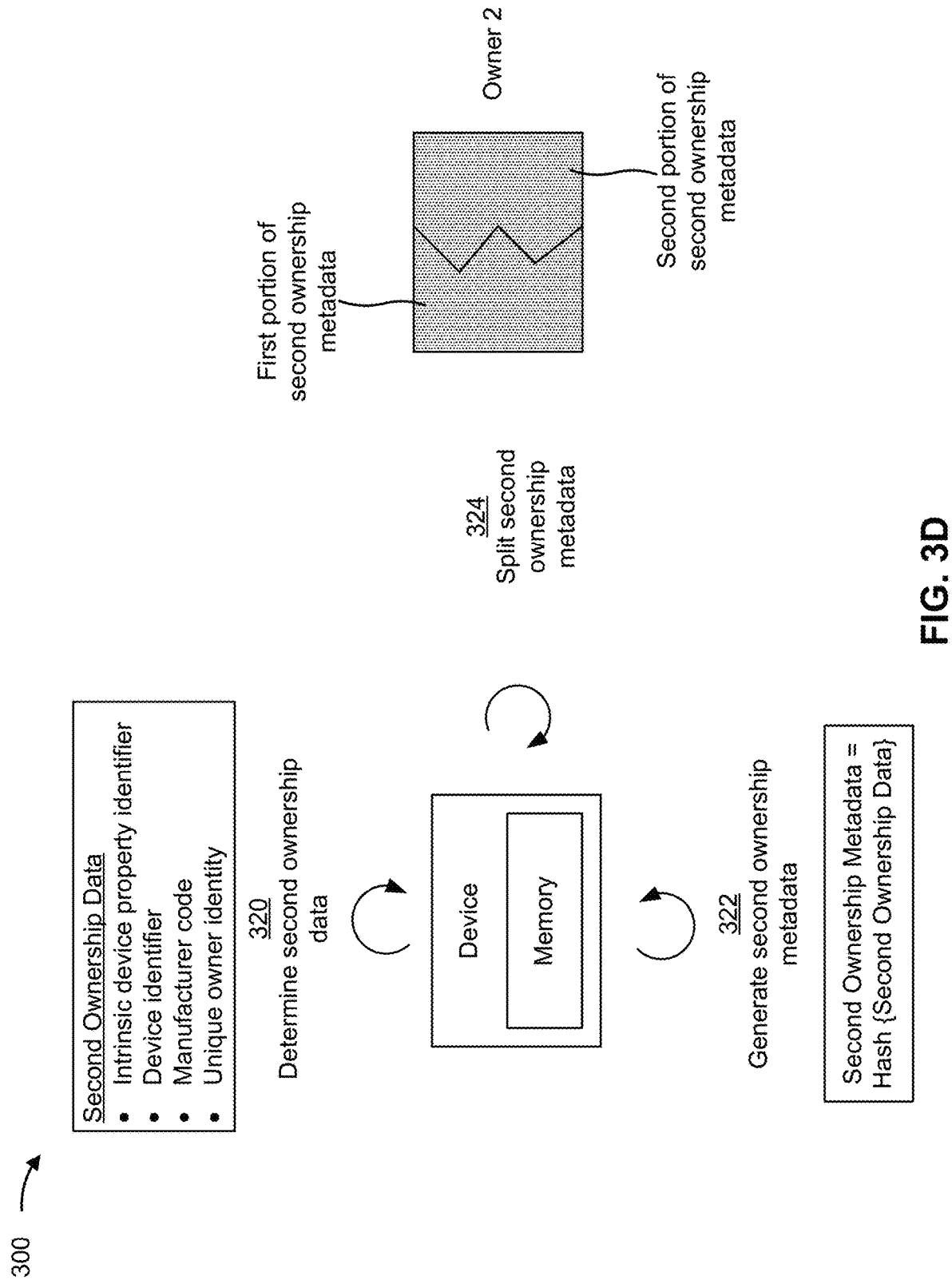

As shown in FIG. 3D, and by reference number 320, the device may determine second ownership data. The second ownership data may be associated with a second owner of the device. The device may determine the second ownership data during a registration process of the device, which may occur when an ownership of the device is transferred from the first owner to the second owner. The second ownership data may include the intrinsic device property identifier, the device identifier or the implementation identifier, the manufacturer code, and/or owner identification data, which may include a unique owner identity associated with the second owner. The intrinsic device property identifier, the device identifier or the implementation identifier, and the manufacturer code may be the same as compared to the first ownership data, but the unique owner identity may be different between the first ownership data and the second ownership data because the first owner is different than the second owner.

As shown by reference number 322, the device may determine second ownership metadata. The device may determine the second ownership metadata based on the second ownership data. In other words, the device may derive the second ownership metadata from the second ownership data. In some implementations, the device may apply a cryptographic function to the second ownership data to obtain the second ownership metadata. As an example, the second ownership metadata may be a hash of the second ownership metadata.

As shown by reference number 324, the device may split the second ownership metadata into a first portion of second ownership metadata and a second portion of second ownership metadata. The first portion of second ownership metadata may be approximately the same size as the second portion of second ownership metadata, or alternatively, the first portion of second ownership metadata may be a different size than the second portion of second ownership metadata. The device may use any suitable technique for splitting the second ownership metadata to form the first portion of second ownership metadata and the second portion of second ownership metadata.

Figure 3E:
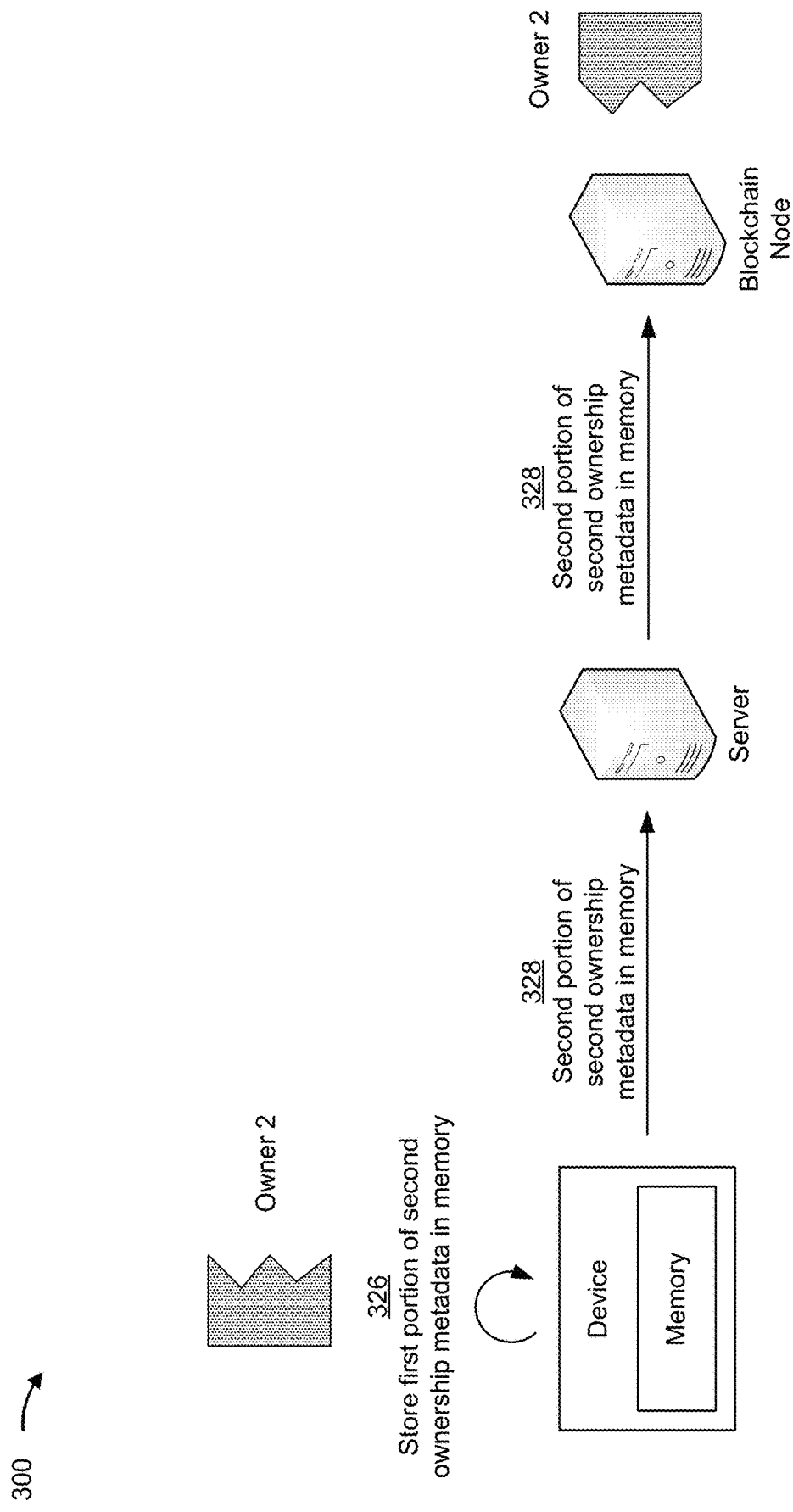

As shown in FIG. 3E, and by reference number 326, the device may store, in the memory of the device, the second portion of first ownership metadata. The device may store the first portion of second ownership metadata in the memory with the embedded hardware security module, which may prevent the first portion of second ownership metadata from being modified. As a result, the first portion of second ownership metadata cannot be maliciously modified in order to alter ownership information. The device may store the first portion of second ownership metadata in the memory for a lifetime of the device (e.g., until the device is decommissioned).

As shown by reference number 328, the device may transmit, to the server, the second portion of second ownership metadata for storage in the blockchain ledger of the blockchain node. The server may receive the second portion of second ownership metadata, and the server may store the second portion of second ownership metadata in the blockchain ledger maintained by the blockchain node. The blockchain ledger may prevent the second portion of second ownership metadata from being modified. The blockchain ledger may be protected by blockchain fundamental tenets of proof-of-work credibility and non-repudiability. As a result, the second portion of second ownership metadata cannot be maliciously modified in order to alter ownership information. The blockchain node may store the second portion of second ownership metadata in the blockchain ledger for the lifetime of the device (e.g., until the device is decommissioned). The first portion of second ownership metadata may be correlated with or cross referenced with the second portion of second ownership metadata, such that the first portion of second ownership metadata may only be combined with the second portion of second ownership data and cannot be combined with any other ownership metadata.

In some implementation, for each new owner of the device, the device may repeat such a process. For example, the device may determine new ownership information, the device may generate new ownership metadata based on the new ownership information, and the device may split the new ownership information into two portions, where a first portion may be stored in the memory of the device and a second portion may be stored in the blockchain ledger of the blockchain node.

Figure 3F:
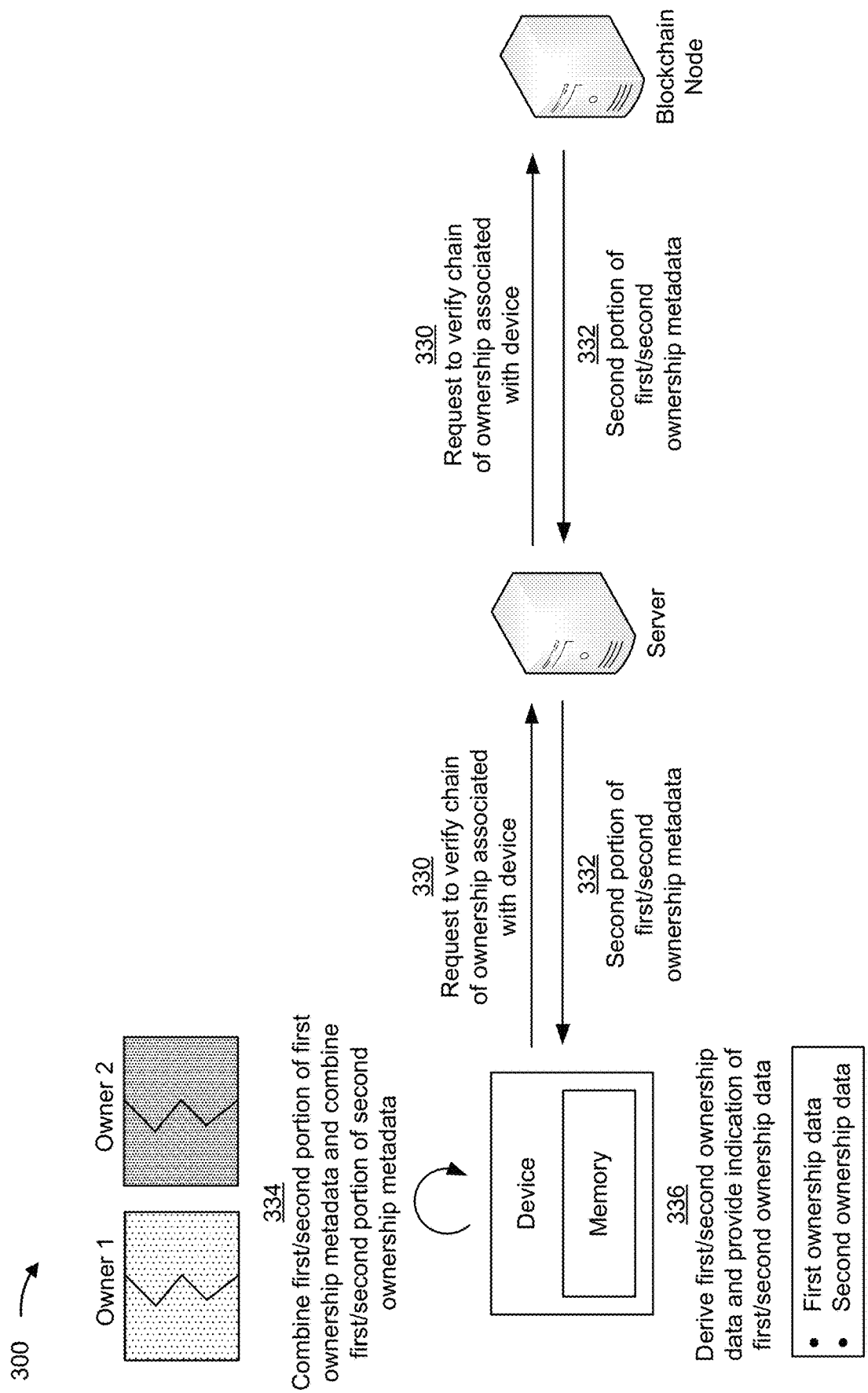

As shown in FIG. 3F, and by reference number 330, the device may transmit, to the server, a request to verify the chain of ownership associated with the device. The device may transmit the request based on an instruction received via the user interface of the device. For example, the second owner may instruct, via the user interface, to verify the chain of ownership associated with the device. At this point in time, the chain of ownership should indicate the first owner and the second owner. The server may receive the request from the device. The server may access the second portion of second ownership metadata from the blockchain node. In other words, the server may send a command to retrieve the second portion of second ownership metadata, which may be stored in the blockchain ledger maintained by the blockchain node.

As shown by reference number 332, the device may receive, from the server and based on the request, the second portion of second ownership metadata. The device may receive the second portion of second ownership metadata from the blockchain node via the server. The device may also receive the second portion of first ownership metadata from the blockchain node via the server.

As shown by reference number 334, the device may combine the first portion of first ownership metadata and the first portion of second ownership metadata, stored in the memory of the device, with the second portion of first ownership metadata and the second portion of second ownership metadata, respectively, to form the first ownership metadata and the second ownership metadata. In other words, the device may combine the first portion of first ownership metadata and the second portion of first ownership metadata to form the first ownership metadata, and the device may combine the first portion of second ownership metadata and the second portion of second ownership metadata to form the second ownership metadata.

As shown by reference number 336, the device may determine or derive the first ownership data and the second ownership data based on the first ownership metadata and the second ownership metadata, respectively. The device may apply a cryptographic function (e.g., a reverse function) to the first ownership metadata and the second ownership metadata to obtain the first ownership data and the second ownership data, respectively. The device may output, via the user interface, an indication of the first ownership data and the second ownership data, where the indication may indicate a verifiable identity of the first owner of the device and a verifiable identity of the second owner of the device.

In some implementations, for each owner that has owned the device, two parts of ownership metadata may be split between the memory of the device and the blockchain ledger of the blockchain node. The ownership metadata may be based on each owner's unique identity, which may be required to be inputted during the registration process. The registration process may occur each time an ownership of the device is transferred between users. The two parts of ownership metadata for each owner may be stored in the memory of the device and in the blockchain ledger of the blockchain node, respectively, during a lifetime of the device. When verifying the chain of ownership, the device may combine the two parts of each ownership metadata to obtain the ownership metadata for each owner, thereby indicating a plurality of owners that have owned the device during the device's lifetime. For each owner, both the memory of the device and the blockchain ledger may be continuously updated with new ownership data.

In some implementations, communications between the device, the server, and the blockchain node may be based on cryptographically protected authenticated and signed request response exchanges. The device and the server may not transmit any data over a network in plain form. Rather, the data may be encrypted via symmetric or asymmetric key based encryption.

As indicated above, FIGS. 3A-3F are provided as examples. Other examples may differ from what is described with regard to FIGS. 3A-3F.

FIGS. 4A-4D are diagrams of an example implementation 400 relating to establishing a chain of ownership of a device. As shown in FIGS. 4A-4D, example implementation 400 includes a device, a server, and a blockchain node that maintains a blockchain ledger, which may be similar to the device, server, and blockchain node described with reference to FIGS. 3A-3F. These devices are described in more detail in connection with FIGS. 6 and 7.

Figure 4A:
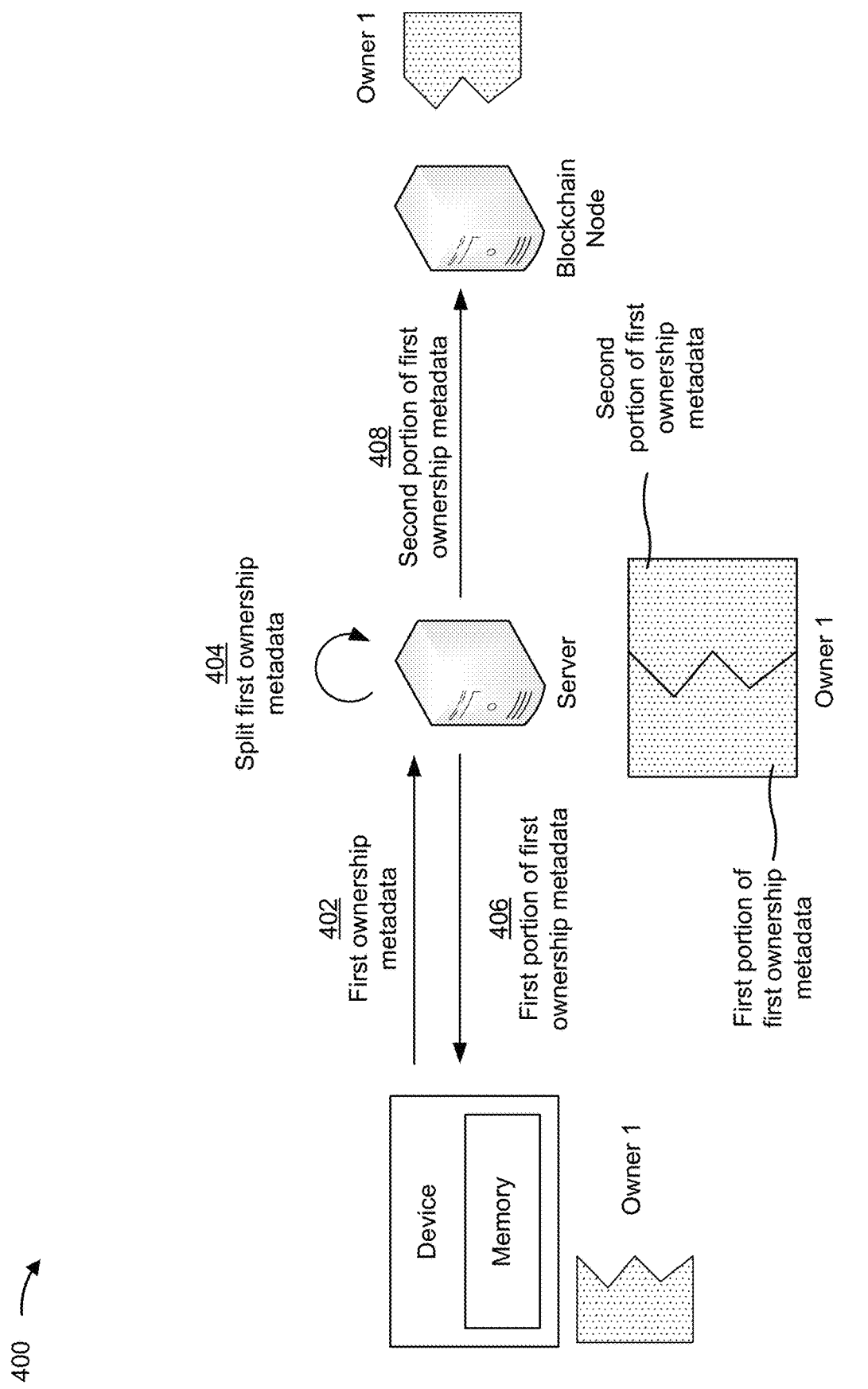
FIGS. 4A-4D are diagrams of an example implementation relating to establishing a chain of ownership of a device.

As shown in FIG. 4A, and by reference number 402, the server may receive, from the device that includes memory with an embedded hardware security module, first ownership metadata. The first ownership metadata may be based on first ownership data associated with the device. The first ownership data may be associated with a first owner of the device. The first ownership data may include an intrinsic device property identifier, a device identifier or an implementation identifier, a manufacturer code, and/or owner identification data, which may include a unique owner identity associated with the first owner.

As shown by reference number 404, the server may split the first ownership metadata into a first portion of first ownership metadata and a second portion of first ownership metadata, where the first portion of first ownership metadata may be correlated with the second portion of first ownership data. In this case, the server may split the first ownership metadata, as opposed to the device, as described in connection with FIGS. 3A-3F.

As shown by reference number 406, the server may transmit, to the device, the first portion of first ownership metadata for storage in the memory of the device. The device may store the first portion of first ownership metadata in the memory of the device. The device may store the first portion of first ownership metadata in the memory with the embedded hardware security module, which may prevent the first portion of first ownership metadata from being modified.

As shown by reference number 408, the server may transmit the second portion of first ownership metadata for storage in the blockchain ledger of the blockchain node. The blockchain ledger may prevent the second portion of first ownership metadata from being modified.

Figure 4B:
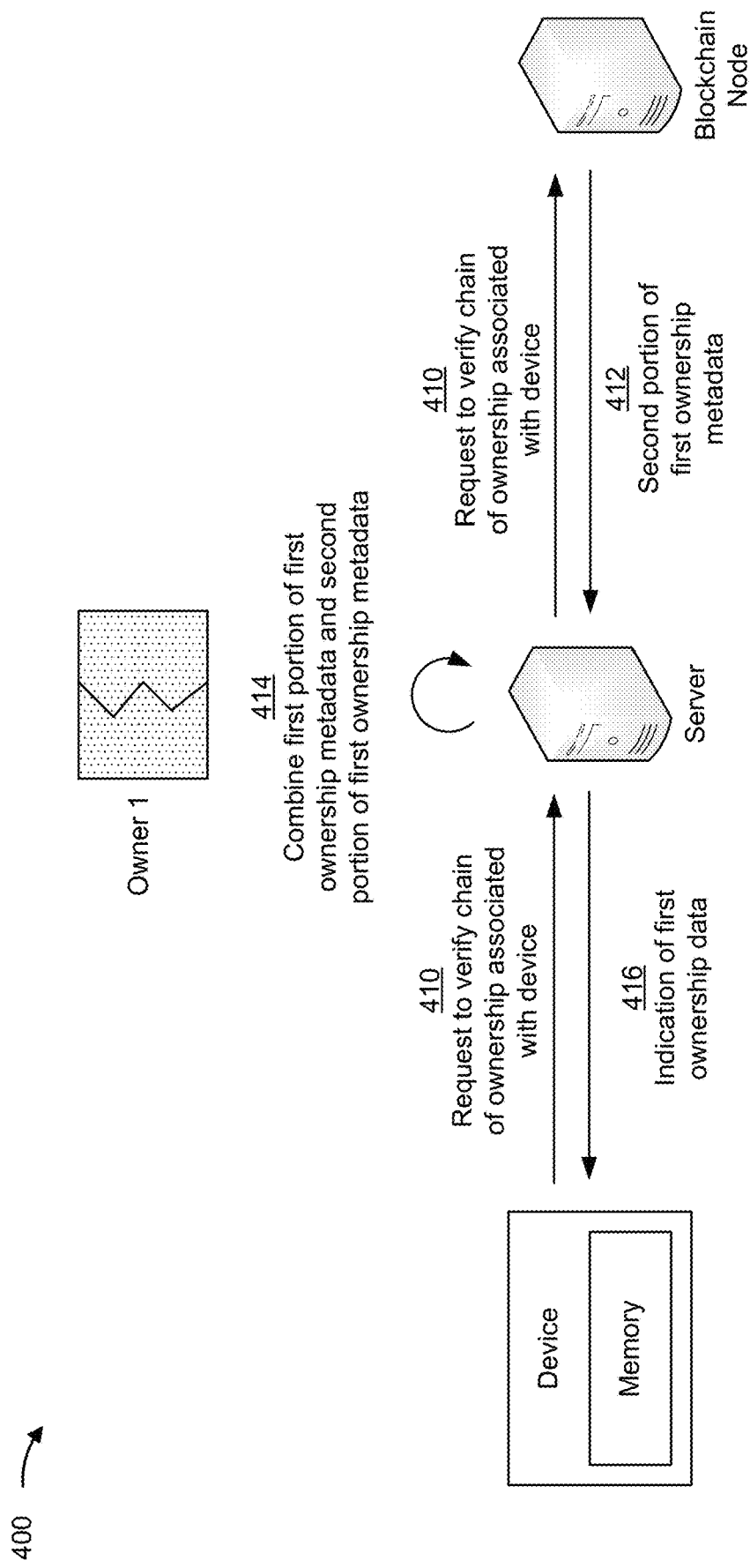

As shown in FIG. 4B, and by reference number 410, the server may receive, from the device, a request to verify the chain of ownership associated with the device. The request may indicate the first portion of first ownership metadata, which may be stored in the memory of the device. The server may forward the request, without the first portion of first ownership metadata, to the blockchain ledger.

As shown by reference number 412, the server may receive, from the blockchain ledger and based on the request, the second portion of first ownership metadata, which may be stored in the blockchain ledger.

As shown by reference number 414, the server may combine the first portion of first ownership metadata with the second portion of first ownership metadata to form the first ownership metadata. The server may combine the first portion of first ownership metadata with the second portion of first ownership metadata based on a determination that the first portion of first ownership metadata is able to be combined with the second portion of first ownership metadata. The server may determine that the first portion of first ownership metadata is able to be combined with the second portion of first ownership metadata based on a determination that the first portion of first ownership metadata has not been modified, while stored in the memory of the device, and based on a determination that the second portion of first ownership metadata has not been modified, while stored in the blockchain ledger. In this case, the server may combine the first portion of first ownership metadata and the second portion of first ownership metadata, as opposed to the device, as described in connection with FIGS. 3A-3F. The server may derive the first ownership data based on the first ownership metadata.

As shown by reference number 416, the server may transmit, to the device, for display via a user interface of the device, an indication of the first ownership data. The indication may indicate a verifiable identity of the first owner of the device. The first owner, a new owner, or a prospective owner may confirm the chain of ownership associated with the device based on the indication of the first ownership data.

Figure 4C:
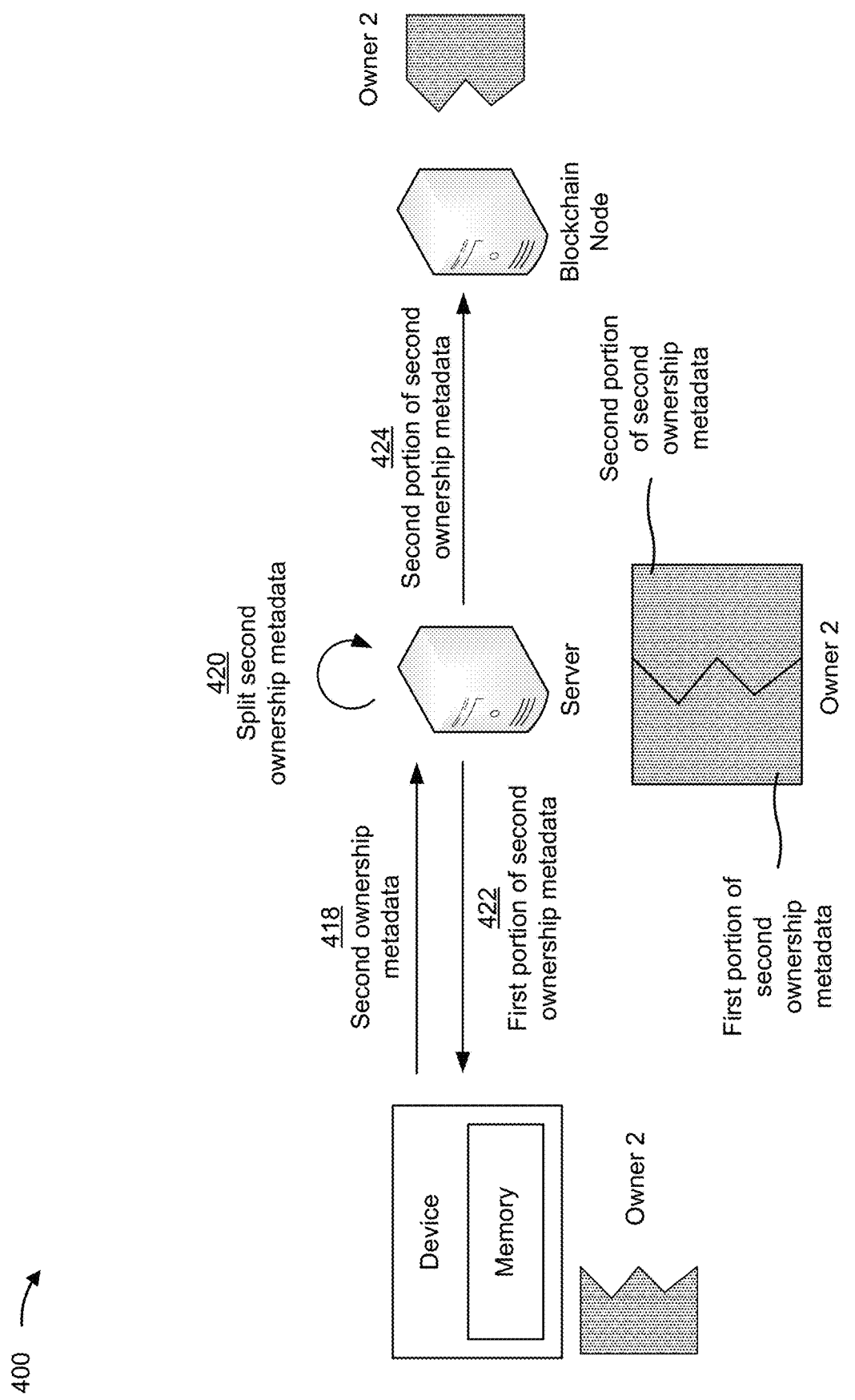

As shown in FIG. 4C, and by reference number 418, the server may receive, from the device, second ownership metadata. The second ownership metadata may be based on second ownership data associated with the device. The second ownership data may be associated with a second owner of the device. The server may verify an authenticity of the second ownership metadata.

As shown by reference number 420, the server may split, based on verifying the authenticity of the second ownership metadata, the second ownership metadata into a first portion of second ownership metadata and a second portion of second ownership metadata. The first portion of second ownership metadata may be correlated with the second portion of second ownership data. The server may split the second ownership metadata, as opposed to the device, as described in connection with FIGS. 3A-3F.

As shown by reference number 422, the server may transmit, to the device, the first portion of second ownership metadata for storage in the memory of the device. As shown by reference number 424, the server may transmit the second portion of second ownership metadata for storage in the blockchain ledger.

Figure 4D:
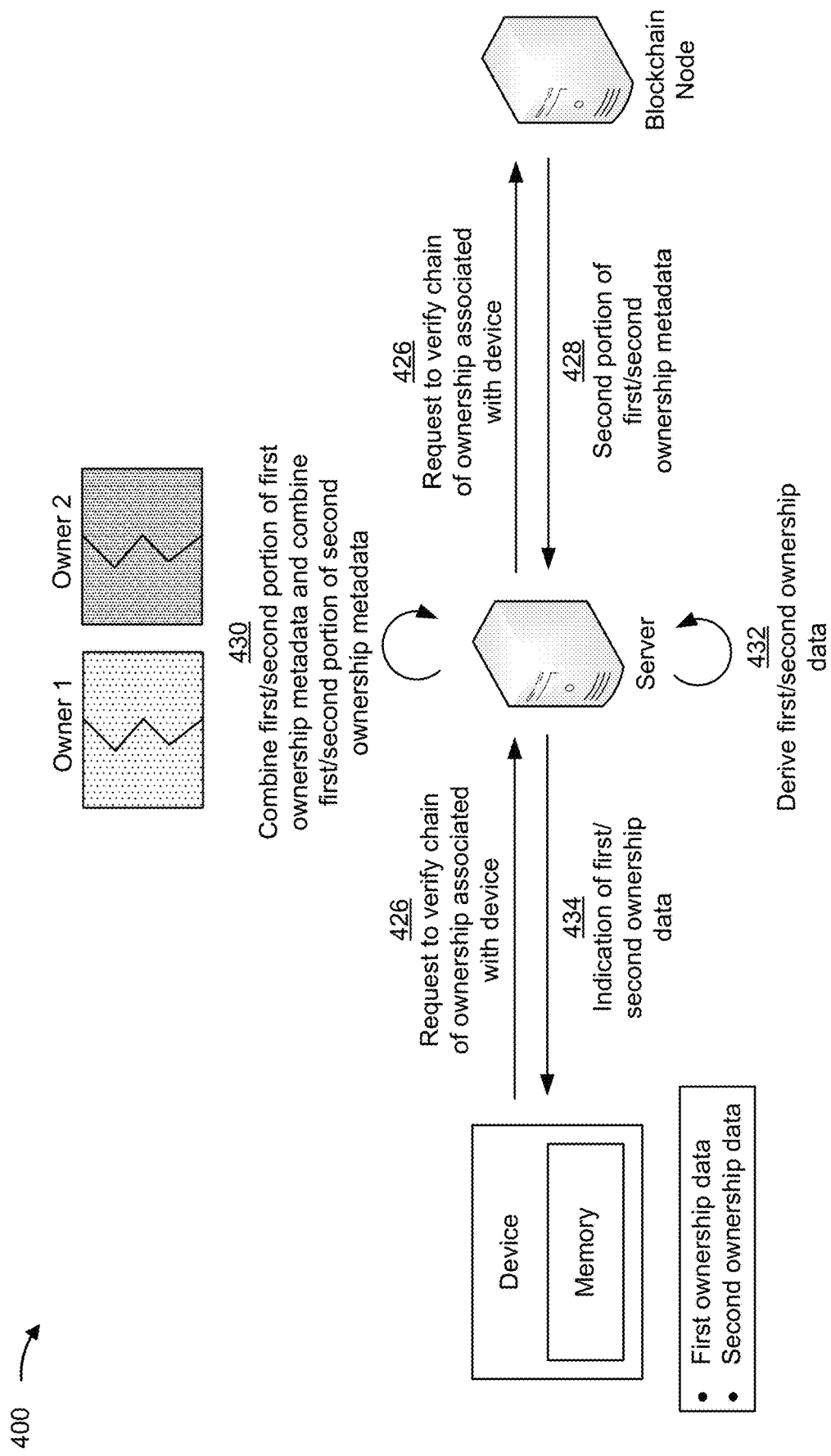

As shown in FIG. 4D, and by reference number 426, the server may receive, from the device, a request to verify the chain of ownership associated with the device. The request may indicate the first portion of first ownership metadata and the first portion of second ownership metadata. The server may forward the request, without the first portion of first ownership metadata and the first portion of second ownership metadata, to the blockchain ledger. As shown by reference number 428, the server may receive, from the blockchain ledger and based on the request, the second portion of first ownership metadata and the second portion of second ownership metadata.

As shown by reference number 430, the server may combine the first portion of first ownership metadata and the first portion of second ownership metadata with the second portion of first ownership metadata and the second portion of second ownership metadata, respectively, to form the first ownership metadata and the second ownership metadata. In other words, the server may combine the first portion of first ownership metadata and the second portion of first ownership metadata to form the first ownership metadata, and the device may combine the first portion of second ownership metadata and the second portion of second ownership metadata to form the second ownership metadata. The server may perform the combination, as opposed to the device, as described in connection with FIGS. 3A-3F.

As shown by reference number 432, the server may derive the first ownership data and the second ownership data based on the first ownership metadata and the second ownership metadata, respectively. As shown by reference number 434, the server may transmit, to the device for display via the user interface of the device, an indication of the first ownership data and the second ownership data. The indication may indicate verifiable identities of the first owner and the second owner of the device.

As indicated above, FIGS. 4A-4D are provided as examples. Other examples may differ from what is described with regard to FIGS. 4A-4D.

Figure 5:
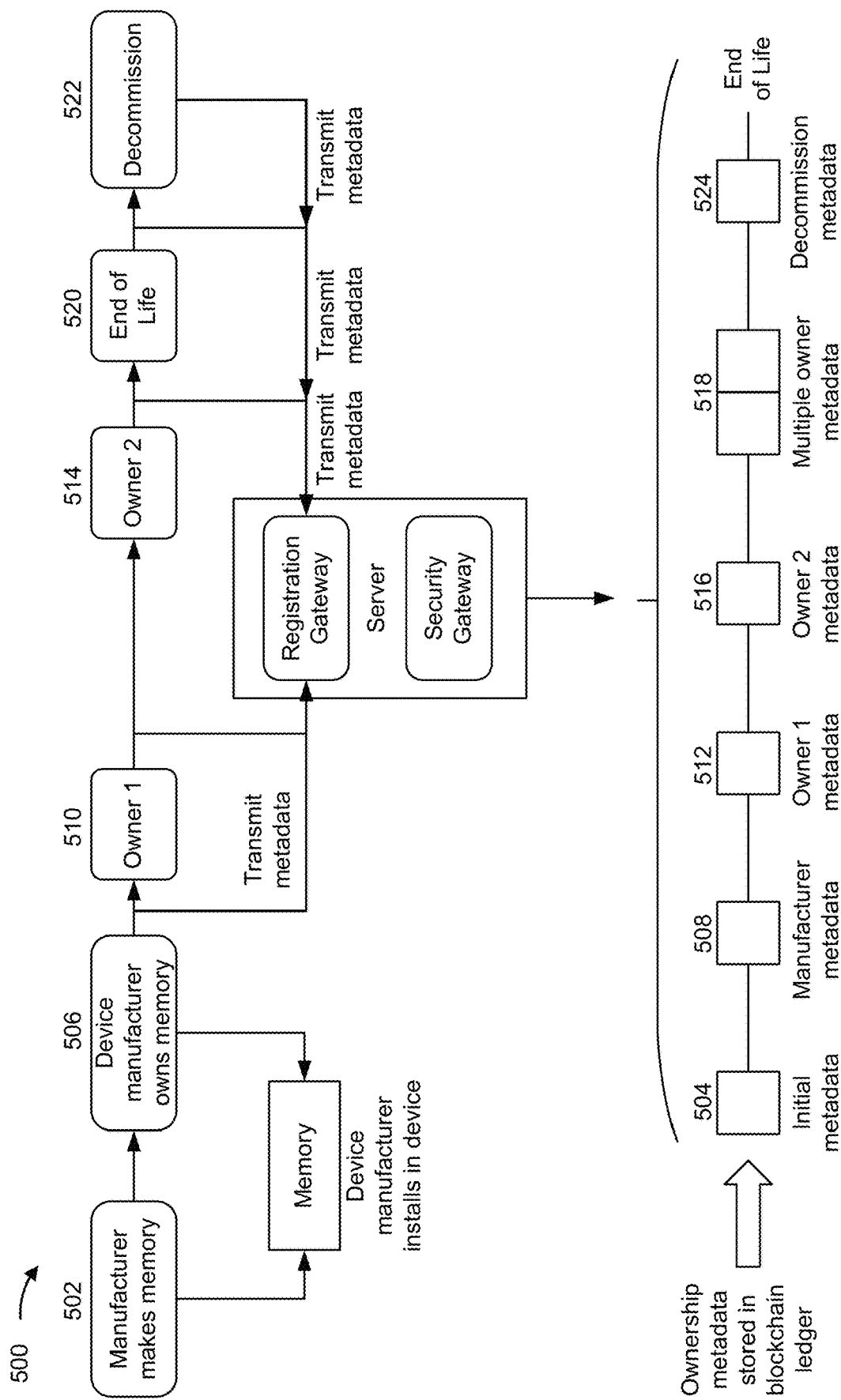
FIG. 5 is a diagram of an example implementation relating to establishing a chain of ownership of a device.

FIG. 5 is a diagram of an example implementation 500 relating to establishing a chain of ownership of a device.

As shown by reference number 502, a memory manufacturer may make a memory with an embedded hardware security module. The memory manufacturer may provide an initial configuration for the memory, and the memory manufacturer may inject a secure private key into the memory. As shown by reference number 504, initial metadata associated with the memory may be stored in a blockchain ledger associated with a blockchain node. The initial metadata may include a unique device secret associated with the memory, which may correspond to an intrinsic device property identifier. The unique device secret may effectively provide a unique fingerprint for the memory. The unique device secret may be stored in the memory, and may not be accessible. As shown by reference number 506, a device manufacturer may install the memory in a device, which may be a vehicle, a laptop, a computer, or any other type of device for which establishing a chain of ownership is desired. The device manufacturer may install the memory in the device and provision the device. As shown by reference number 508, manufacturer metadata associated with the device may be stored in the blockchain ledger. The blockchain ledger may be associated with the memory manufacturer or the device manufacturer.

As shown by reference number 510, after the device that includes the memory is manufactured, the device may be purchased by a first owner (Owner 1). After purchasing the device, in order for the device to function, a registration process may be required to register the first owner. During the registration process, the device may obtain first ownership data (e.g., first credentials) associated with the first owner. The first ownership data may include a unique owner identity associated with the first owner. The first ownership data may be verified using a server, which may include a registration gateway. The device may determine first ownership metadata based on the first ownership data. The device may transmit the first ownership metadata to the server, which may include a security gateway, which may be associated with the memory manufacturer or the device manufacturer.

As shown by reference number 512, the first ownership metadata may be stored in the blockchain ledger, which may maintain verifiable blockchain-protected ownership metadata. A portion of the first ownership metadata may be stored in the memory of the device. The first ownership metadata may be encrypted prior to being stored in the blockchain ledger and the memory of the device.

As shown by reference number 514, when an ownership of the device changes from the first owner to a second owner (Owner 2), a registration process may be required to register the second owner. During the registration process, the device may obtain second ownership data (e.g., second credentials) associated with the second owner. The second ownership data may include a unique owner identity associated with the second owner. The second ownership data may be verified using the server, which may include the registration gateway. The device may determine second ownership metadata based on the second ownership data. The device may transmit the second ownership metadata to the server, which may include the security gateway.

As shown by reference number 516, the second ownership metadata may be stored in the blockchain ledger, which may maintain verifiable blockchain-protected ownership metadata. A portion of the second ownership metadata may be stored in the memory of the device. The second ownership metadata may be encrypted prior to being stored in the blockchain ledger and the memory of the device.

As shown by reference number 518, the blockchain ledger may store multiple ownership metadata. In other words, the blockchain ledger may store ownership metadata for each of a plurality of owners that have owned the device, where the plurality of users form a chain of ownership of the device. The blockchain ledger may store, for each individual owner, a portion of ownership metadata, while the other portion of ownership metadata is stored in the memory of the device. In some implementations, a block of the blockchain ledger may store the initial metadata associated with the memory, the manufacturer metadata, and multiple portions of ownership metadata associated with past owners and a current owner of the device.

As shown by reference number 520, the device may determine that an end of life is imminent. The end of life may be based on an inoperability of the device, and/or based on the device no longer being functional. As shown by reference number 522, the device may determine to perform a decommission process. As shown by reference number 524, decommission metadata may be stored in the blockchain ledger. During the decommission process, all other ownership metadata may be removed from the blockchain ledger and/or the memory of the device. At this point, the device may reach the end of life and may no longer be operable.

As indicated above, FIG. 5 is provided as an example. Other examples may differ from what is described with regard to FIG. 5.

Figure 6:
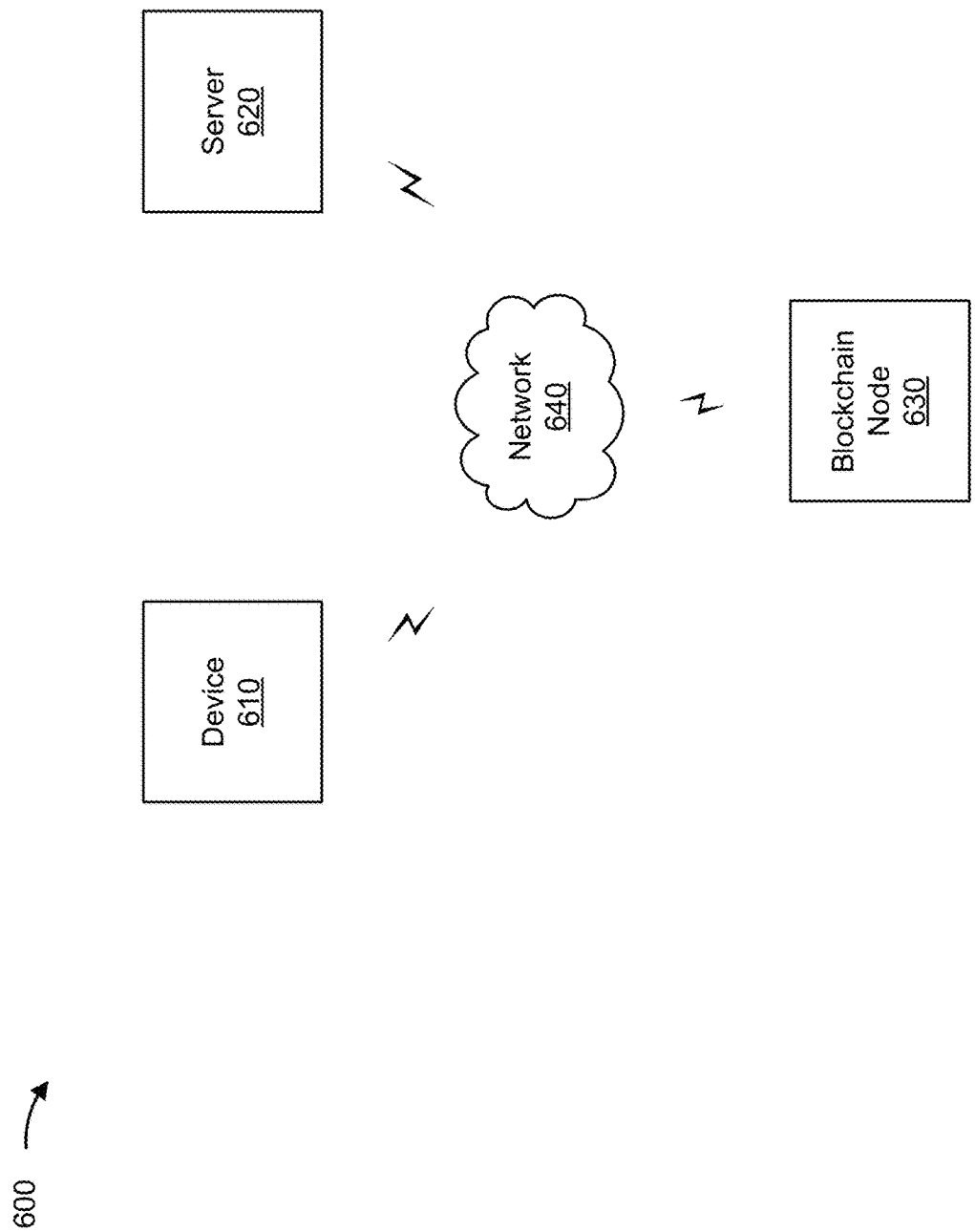
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include a device 610 (which may correspond to device 170), a server 620 (which may correspond to server 180), a blockchain node 630 (which may correspond to blockchain node 190), and a network 640. Devices of environment 600 may interconnect via wired connections, wireless connections, or a combination of wired and wireless connections.

A device 610 includes one or more devices capable of receiving, generating, storing, processing, and/or providing information associated with establishing a chain of ownership of a device, as described elsewhere herein. The device 610 may be a vehicle, a mobile device, a computer, or any other type of electronic device for which a chain of ownership is to be established. The device 610 may include a memory with an embedded hardware security module. The device 610 may include a memory controller.

The server 620 includes one or more devices capable of receiving, generating, storing, processing, providing, and/or routing information associated with establishing a chain of ownership of a device, as described elsewhere herein. The server 620 may include a communication device and/or a computing device. For example, the server 620 may be an application server, a client server, a web server, a database server, a host server, a proxy server, a virtual server (e.g., executing on computing hardware), or a server in a cloud computing system. In some implementations, the server 620 includes computing hardware used in a cloud computing environment.

The blockchain node 630 includes one or more devices capable of receiving, generating, storing, processing, providing, and/or routing information associated with establishing a chain of ownership of a device, as described elsewhere herein. The blockchain node 630 may maintain a blockchain ledger, in which ownership metadata may be stored. The blockchain node 630 may include a communication device and/or a computing device. For example, the blockchain node 630 may be a server, such as an application server, a client server, a web server, a database server, a host server, a proxy server, a virtual server (e.g., executing on computing hardware), or a server in a cloud computing system. In some implementations, the blockchain node 630 includes computing hardware used in a cloud computing environment.

The network 640 includes one or more wired and/or wireless networks. For example, the network 640 may include a cellular network, a public land mobile network, a local area network, a wide area network, a metropolitan area network, a telephone network, a private network, the Internet, and/or a combination of these or other types of networks. The network 640 enables communication among the devices of environment 600.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

FIG. 7 is a diagram of example components of a device 700, which may correspond to device 170, server 180, blockchain node 190, device 610, server 620, and/or blockchain node 630. In some implementations, device 170, server 180, blockchain node 190, device 610, server 620, and/or blockchain node 630 include one or more devices 700 and/or one or more components of device 700. As shown in FIG. 7, device 700 may include a bus 710, a processor 720, a memory 730, an input component 740, an output component 750, and a communication component 760.

Bus 710 includes one or more components that enable wired and/or wireless communication among the components of device 700. Bus 710 may couple together two or more components of FIG. 7, such as via operative coupling, communicative coupling, electronic coupling, and/or electric coupling. Processor 720 includes a central processing unit, a graphics processing unit, a microprocessor, a controller, a microcontroller, a digital signal processor, a field-programmable gate array, an application-specific integrated circuit, and/or another type of processing component. Processor 720 is implemented in hardware, firmware, or a combination of hardware and software. In some implementations, processor 720 includes one or more processors capable of being programmed to perform one or more operations or processes described elsewhere herein.

Memory 730 includes volatile and/or nonvolatile memory. For example, memory 730 may include random access memory (RAM), read only memory (ROM), a hard disk drive, and/or another type of memory (e.g., a flash memory, a magnetic memory, and/or an optical memory). Memory 730 may include internal memory (e.g., RAM, ROM, or a hard disk drive) and/or removable memory (e.g., removable via a universal serial bus connection). Memory 730 may be a non-transitory computer-readable medium. Memory 730 stores information, instructions, and/or software (e.g., one or more software applications) related to the operation of device 700. In some implementations, memory 730 includes one or more memories that are coupled to one or more processors (e.g., processor 720), such as via bus 710.

Input component 740 enables device 700 to receive input, such as user input and/or sensed input. For example, input component 740 may include a touch screen, a keyboard, a keypad, a mouse, a button, a microphone, a switch, a sensor, a global positioning system sensor, an accelerometer, a gyroscope, and/or an actuator. Output component 750 enables device 700 to provide output, such as via a display, a speaker, and/or a light-emitting diode. Communication component 760 enables device 700 to communicate with other devices via a wired connection and/or a wireless connection. For example, communication component 760 may include a receiver, a transmitter, a transceiver, a modem, a network interface card, and/or an antenna.

Device 700 may perform one or more operations or processes described herein. For example, a non-transitory computer-readable medium (e.g., memory 730) may store a set of instructions (e.g., one or more instructions or code) for execution by processor 720. Processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry is used instead of or in combination with the instructions to perform one or more operations or processes described herein. Additionally, or alternatively, processor 720 may be configured to perform one or more operations or processes described herein. Thus, implementations described herein are not limited to any specific combination of hardware circuitry and software.

The number and arrangement of components shown in FIG. 7 are provided as an example. Device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

FIG. 8 is a flowchart of an example method 800 associated with establishing a chain of ownership of a device. In some implementations, one or more process blocks of FIG. 8 may be performed by a device (e.g., device 170, and/or device 610). In some implementations, one or more process blocks of FIG. 8 may be performed by another device or a group of devices separate from or including the device, such as server 180 and/or server 620. Additionally, or alternatively, one or more process blocks of FIG. 8 may be performed by one or more components of device 700, such as processor 720, memory 730, input component 740, output component 750, and/or communication component 760.

As shown in FIG. 8, the method 800 may include determining first ownership metadata based on first ownership data associated with the device, wherein the first ownership data is associated with a first owner of the device (block 810). The method 800 may include splitting the first ownership metadata into a first portion of first ownership metadata and a second portion of first ownership metadata, wherein the first portion of first ownership metadata is correlated with the second portion of first ownership data (block 820). The method 800 may include storing, in a memory of the device, the first portion of first ownership metadata (block 830). The method 800 may include transmitting, to a server, the second portion of first ownership metadata for storage in a blockchain ledger of a blockchain node, wherein a chain of ownership associated with the device is established based on a combination of the first portion of first ownership metadata stored in the memory of the device and the second portion of first ownership metadata stored in the blockchain ledger (block 840).

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform one or more other methods based on operations described herein, such as the operations described in connection with FIGS. 1-2, 3A-3F, 4A-4D, and 5.

FIG. 9 is a flowchart of an example method 900 associated with establishing a chain of ownership of a device. In some implementations, one or more process blocks of FIG. 9 may be performed by a server (e.g., server 180, and/or server 620). In some implementations, one or more process blocks of FIG. 9 may be performed by another device or a group of devices separate from or including the server, such as device 170 and/or device 610. Additionally, or alternatively, one or more process blocks of FIG. 9 may be performed by one or more components of device 700, such as processor 720, memory 730, input component 740, output component 750, and/or communication component 760.

As shown in FIG. 9, the method 900 may include receiving, from a device that includes memory with an embedded hardware security module, first ownership metadata, wherein the first ownership metadata is based on first ownership data associated with the device, and wherein the first ownership data is associated with a first owner of the device (block 910). The method 900 may include splitting the first ownership metadata into a first portion of first ownership metadata and a second portion of first ownership metadata, wherein the first portion of first ownership metadata is correlated with the second portion of first ownership data (block 920). The method 900 may include transmitting, to the device, the first portion of first ownership metadata for storage in the memory of the device (block 930). The method 900 may include transmitting the second portion of first ownership metadata for storage in a blockchain ledger of a blockchain node, wherein a chain of ownership associated with the device is verifiable based on the first portion of first ownership metadata stored in the memory of the device and the second portion of first ownership metadata stored in the blockchain ledger (block 940).

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform one or more other methods based on operations described herein, such as the operations described in connection with FIGS. 1-2, 3A-3F, 4A-4D, and 5.

FIG. 10 is a flowchart of an example method 1000 associated with establishing a chain of ownership of a device. In some implementations, one or more process blocks of FIG. 10 may be performed by a device (e.g., device 170, and/or device 610). In some implementations, one or more process blocks of FIG. 10 may be performed by another device or a group of devices separate from or including the device, such as server 180 and/or server 620. Additionally, or alternatively, one or more process blocks of FIG. 10 may be performed by one or more components of device 700, such as processor 720, memory 730, input component 740, output component 750, and/or communication component 760.

As shown in FIG. 10, the method 1000 may include receiving, by a device that includes memory with an embedded hardware security module and during a registration process, first ownership data associated with a first owner of the device, wherein the first ownership data includes an intrinsic property of the memory (block 1010). The method 1000 may include generating, by the device, first ownership metadata based on the first ownership data (block 1020). The method 1000 may include splitting, by the device, the first ownership metadata into a first portion of first ownership metadata and a second portion of first ownership metadata, wherein the first portion of first ownership metadata is cross referenced with the second portion of first ownership data (block 1030). The method 1000 may include storing, in the memory of the device, the first portion of first ownership metadata (block 1040). The method 1000 may include transmitting, by the device to a server, the second portion of first ownership metadata for storage in a blockchain ledger of a blockchain node (block 1050). The method 1000 may include receiving, via a user interface of the device, a request to verify a chain of ownership associated with the device, wherein the chain of ownership associated with the device is verifiable based on the first portion of first ownership metadata stored in the memory of the device and the second portion of first ownership metadata stored in the blockchain ledger (block 1060).

Although FIG. 10 shows example blocks of a method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel. The method 1000 is an example of one method that may be performed by one or more devices described herein. These one or more devices may perform one or more other methods based on operations described herein, such as the operations described in connection with FIGS. 1-2, 3A-3F, 4A-4D, and 5.

In some implementations, a device includes memory including an embedded hardware security module; and one or more components configured to: determine first ownership metadata based on first ownership data associated with the device, wherein the first ownership data is associated with a first owner of the device; split the first ownership metadata into a first portion of first ownership metadata and a second portion of first ownership metadata, wherein the first portion of first ownership metadata is correlated with the second portion of first ownership data; store, in the memory of the device, the first portion of first ownership metadata; and transmit, to a server, the second portion of first ownership metadata for storage in a blockchain ledger of a blockchain node, wherein a chain of ownership associated with the device is established based on a combination of the first portion of first ownership metadata stored in the memory of the device and the second portion of first ownership metadata stored in the blockchain ledger.

In some implementations, a server includes one or more components configured to: receive, from a device that includes memory with an embedded hardware security module, first ownership metadata, wherein the first ownership metadata is based on first ownership data associated with the device, and wherein the first ownership data is associated with a first owner of the device; split the first ownership metadata into a first portion of first ownership metadata and a second portion of first ownership metadata, wherein the first portion of first ownership metadata is correlated with the second portion of first ownership data; transmit, to the device, the first portion of first ownership metadata for storage in the memory of the device; and transmit the second portion of first ownership metadata for storage in a blockchain ledger of a blockchain node, wherein a chain of ownership associated with the device is verifiable based on the first portion of first ownership metadata stored in the memory of the device and the second portion of first ownership metadata stored in the blockchain ledger.

In some implementations, a method includes receiving, by a device that includes memory with an embedded hardware security module and during a registration process, first ownership data associated with a first owner of the device, wherein the first ownership data includes an intrinsic property of the memory; generating, by the device, first ownership metadata based on the first ownership data; splitting, by the device, the first ownership metadata into a first portion of first ownership metadata and a second portion of first ownership metadata, wherein the first portion of first ownership metadata is cross referenced with the second portion of first ownership data; storing, in the memory of the device, the first portion of first ownership metadata; transmitting, by the device to a server, the second portion of first ownership metadata for storage in a blockchain ledger of a blockchain node; and receiving, via a user interface of the device, a request to verify a chain of ownership associated with the device, wherein the chain of ownership associated with the device is verifiable based on the first portion of first ownership metadata stored in the memory of the device and the second portion of first ownership metadata stored in the blockchain ledger.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   memory including an embedded hardware security module; and
   one or more components configured to:
      determine first ownership metadata based on first ownership data associated with the device, wherein the first ownership data is associated with a first owner of the device;
      split the first ownership metadata into a first portion of first ownership metadata and a second portion of first ownership metadata, wherein the first portion of first ownership metadata is correlated with the second portion of first ownership data;
      store, in the memory of the device, the first portion of first ownership metadata;
      transmit, to a server, the second portion of first ownership metadata for storage in a blockchain ledger of a blockchain node, wherein a chain of ownership associated with the device is established based on a combination of the first portion of first ownership metadata stored in the memory of the device and the second portion of first ownership metadata stored in the blockchain ledger;
      transmit, to the server, a request to verify the chain of ownership associated with the device;
      receive, from the server and based on the request, the second portion of first ownership metadata;
      combine the first portion of first ownership metadata with the second portion of first ownership metadata to form the first ownership metadata, based on a determination that the first portion of first ownership metadata is able to be combined with the second portion of first ownership metadata; and
      derive the first ownership data based on the first ownership metadata.

2. The device of claim 1, wherein the one or more components are further configured to:
   output, via a user interface, an indication of the first ownership data, wherein the indication indicates a verifiable identity of the first owner of the device.

3. The device of claim 1, wherein the one or more components are further configured to:
   determine that the first portion of first ownership metadata is able to be combined with the second portion of first ownership metadata based on a determination that the first portion of first ownership metadata has not been modified, while stored in the memory of the device, and based on a determination that the second portion of first ownership metadata has not been modified, while stored in the blockchain ledger.

4. The device of claim 1, wherein the one or more components are further configured to:
   determine second ownership metadata based on second ownership data associated with the device, wherein the second ownership data is associated with a second owner of the device;
   split the second ownership metadata into a first portion of second ownership metadata and a second portion of second ownership metadata, wherein the first portion of second ownership metadata is correlated with the second portion of second ownership data;
   store, in the memory of the device, the first portion of second ownership metadata; and
   transmit, to the server, the second portion of second ownership metadata for storage in the blockchain ledger.

5. The device of claim 4, wherein the one or more components are further configured to:
   receive, from the server and based on the request, the second portion of first ownership metadata and the second portion of second ownership metadata;
   combine the first portion of first ownership metadata and the first portion of second ownership metadata, stored in the memory of the device, with the second portion of first ownership metadata and the second portion of second ownership metadata, respectively, to form the first ownership metadata and the second ownership metadata;
   derive the first ownership data and the second ownership data based on the first ownership metadata and the second ownership metadata, respectively; and
   output, via a user interface, an indication of the first ownership data and the second ownership data, wherein the indication indicates verifiable identities of the first owner and the second owner of the device.

6. The device of claim 1, wherein the first ownership data includes one or more of: an intrinsic device property identifier, a device identifier, a manufacturer code, or a unique owner identity, and wherein the first ownership metadata is a hash of the first ownership data.

7. The device of claim 1, wherein the one or more components are further configured to:
   encrypt, by the device, the first portion of first ownership metadata and the second portion of first ownership metadata, prior to storage in the memory of the device and in the blockchain ledger, respectively.

8. The device of claim 7, wherein the one or more components are further configured to:
   decrypt, by the device, the first portion of first ownership metadata and the second portion of first ownership metadata, prior to combining the first portion of first ownership metadata with the second portion of first ownership metadata to form the first ownership metadata.

9. The device of claim 1, wherein the server and the blockchain ledger are associated with one or more of: a manufacturer of the memory with the embedded hardware security module, or a manufacturer of the device that comprises the memory with the embedded hardware security module.

10. A server, comprising:
one or more hardware processors and one or more memories configured to:
receive, from a device that includes memory with an embedded hardware security module, first ownership metadata, wherein the first ownership metadata is based on first ownership data associated with the device, and wherein the first ownership data is associated with a first owner of the device;
split the first ownership metadata into a first portion of first ownership metadata and a second portion of first ownership metadata, wherein the first portion of first ownership metadata is correlated with the second portion of first ownership data;
transmit, to the device, the first portion of first ownership metadata for storage in the memory of the device, wherein the first portion of first ownership metadata is encrypted by the server prior to storage in the memory of the device; and
transmit the second portion of first ownership metadata for storage in a blockchain ledger of a blockchain node, wherein a chain of ownership associated with the device is verifiable based on the first portion of first ownership metadata stored in the memory of the device and the second portion of first ownership metadata stored in the blockchain ledger, and wherein the second portion of first ownership metadata is encrypted by the server prior to storage in the blockchain ledger.

11. The server of claim 10, wherein the one or more hardware processors and the one or more memories are further configured to:
receive, from the device, a request to verify the chain of ownership associated with the device, wherein the request indicates the first portion of first ownership metadata;
receive, from the blockchain ledger and based on the request, the second portion of first ownership metadata;
combine the first portion of first ownership metadata with the second portion of first ownership metadata to form the first ownership metadata, based on a determination that the first portion of first ownership metadata is able to be combined with the second portion of first ownership metadata;
derive the first ownership data based on the first ownership metadata; and
transmit, to the device, for display via a user interface of the device, an indication of the first ownership data, wherein the indication indicates a verifiable identity of the first owner of the device.

12. The server of claim 11, wherein the one or more hardware processors and the one or more memories are further configured to:
determine that the first portion of first ownership metadata is able to be combined with the second portion of first ownership metadata based on a determination that the first portion of first ownership metadata has not been modified, while stored in the memory of the device, and based on a determination that the second portion of first ownership metadata has not been modified, while stored in the blockchain ledger.

13. The server of claim 10, wherein the one or more hardware processors and the one or more memories are further configured to:
receive, from the device, second ownership metadata, wherein the second ownership metadata is based on second ownership data associated with the device, and wherein the second ownership data is associated with a second owner of the device;
verify an authenticity of the second ownership metadata;
split, based on verifying the authenticity of the second ownership metadata, the second ownership metadata into a first portion of second ownership metadata and a second portion of second ownership metadata, wherein the first portion of second ownership metadata is correlated with the second portion of second ownership data;
transmit, to the device, the first portion of second ownership metadata for storage in the memory of the device; and
transmit the second portion of second ownership metadata for storage in the blockchain ledger.

14. The server of claim 13, wherein the one or more hardware processors and the one or more memories are further configured to:
receive, from the device, a request to verify the chain of ownership associated with the device, wherein the request indicates the first portion of first ownership metadata and the first portion of second ownership metadata;
receive, from the blockchain ledger and based on the request, the second portion of first ownership metadata and the second portion of second ownership metadata;
combine the first portion of first ownership metadata and the first portion of second ownership metadata with the second portion of first ownership metadata and the second portion of second ownership metadata, respectively, to form the first ownership metadata and the second ownership metadata;
derive the first ownership data and the second ownership data based on the first ownership metadata and the second ownership metadata, respectively; and
transmit, to the device for display via a user interface of the device, an indication of the first ownership data and the second ownership data, wherein the indication indicates verifiable identities of the first owner and the second owner of the device.

15. The server of claim 10, wherein the first ownership data includes one or more of: an intrinsic device property identifier, a device identifier, a manufacturer code, or a unique owner identity, and wherein the first ownership metadata is derived from the first ownership data.

16. The server of claim 10, wherein the one or more hardware processors and the one or more memories are further configured to:
decrypt, by the server, the first portion of first ownership metadata and the second portion of first ownership metadata, prior to combining the first portion of first ownership metadata with the second portion of first ownership metadata to form the first ownership metadata.

17. The server of claim 10, wherein a block of the blockchain ledger is configured to store initial metadata associated with the memory, manufacturer metadata, the second portion of first ownership metadata associated with the first owner, and additional portions of additional ownership metadata associated with additional owners of the device.

18. A method, comprising:
receiving, by a device that includes memory with an embedded hardware security module and during a registration process, first ownership data associated with a first owner of the device, wherein the first ownership data includes an intrinsic property of the memory;

transmitting, to a server, the first ownership data;

receiving, from the server, an indication that the first ownership data has been verified;

generating, by the device, first ownership metadata based on the first ownership data and based on the indication that the first ownership data has been verified;

splitting, by the device, the first ownership metadata into a first portion of first ownership metadata and a second portion of first ownership metadata, wherein the first portion of first ownership metadata is cross referenced with the second portion of first ownership data;

storing, in the memory of the device, the first portion of first ownership metadata;

transmitting, by the device to the server, the second portion of first ownership metadata for storage in a blockchain ledger of a blockchain node; and receiving, via a user interface of the device, a request to verify a chain of ownership associated with the device, wherein the chain of ownership associated with the device is verifiable based on the first portion of first ownership metadata stored in the memory of the device and the second portion of first ownership metadata stored in the blockchain ledger.

19. The method of claim 18, further comprising:

receiving, from the server and based on the request, the second portion of first ownership metadata;

determining that the first portion of first ownership metadata, stored in the memory of the device, is able to be combined with the second portion of first ownership metadata;

combining the first portion of first ownership metadata with the second portion of first ownership metadata to form the first ownership metadata;

deriving the first ownership data based on the first ownership metadata; and providing, via the user interface, an indication of the first ownership data, wherein the indication indicates a verifiable identity of the first owner of the device.

20. The method of claim 18, further comprising:

receiving, from the server and based on the request, the second portion of first ownership metadata;

determining that the first portion of first ownership metadata, stored in the memory of the device, is not able to be combined with the second portion of first ownership metadata based on a determination that a modification has been made to the first portion of first ownership metadata, while stored in the memory of the device, or based on a determination that a modification has been made to the second portion of first ownership metadata, while stored in the blockchain ledger; and providing, via the user interface, an alert indicating that an unauthorized modification has been made to the first ownership metadata.

21. The method of claim 18, further comprising:

receiving, by the device, second ownership data associated with a second owner of the device, wherein the second ownership data is received based on a transfer of ownership of the device from the first owner to the second owner;

generating, by the device, second ownership metadata based on the second ownership data;

splitting the second ownership metadata into a first portion of second ownership metadata and a second portion of second ownership metadata, wherein the first portion of second ownership metadata is correlated with the second portion of second ownership data;

storing, in the memory of the device, the first portion of second ownership metadata; and transmitting, to the server, the second portion of second ownership metadata for storage in the blockchain ledger, wherein the chain of ownership associated with the device is verifiable based on the first portion of second ownership metadata stored in the memory of the device and the second portion of second ownership metadata stored in the blockchain ledger.

22. The method of claim 18, wherein the server and the blockchain ledger are associated with one or more of: a manufacturer of the memory with the embedded hardware security module, or a manufacturer of the device that contains includes the memory with the embedded hardware security module.

23. The method of claim 18, wherein communications between the device and the server are based on cryptographically protected authenticated and signed request response exchanges.

24. The server of claim 10, wherein the server and the blockchain ledger are associated with one or more of: a manufacturer of the memory, or a manufacturer of the device that includes the memory.

25. The method of claim 18, wherein the first ownership data includes one or more of: an intrinsic device property identifier, a device identifier, a manufacturer code, or a unique owner identity.

\* \* \* \* \*